US011419258B2

(12) United States Patent
Reich et al.

(10) Patent No.: US 11,419,258 B2
(45) Date of Patent: Aug. 23, 2022

(54) SECTIONAL CONTROL DEVICE

(71) Applicant: Intelligent Agricultural Solutions LLC, North Fargo, ND (US)

(72) Inventors: Adam Reich, Fargo, ND (US); Nicholas Struve, Fargo, ND (US); Barry Batcheller, Fargo, ND (US); Paul Nystuen, West Fargo, ND (US)

(73) Assignee: IAS, Fargo, ND (US)

(*) Notice: Subject to any disclaimer, the term of this patent is extended or adjusted under 35 U.S.C. 154(b) by 245 days.

(21) Appl. No.: 16/626,144

(22) PCT Filed: Jun. 18, 2018

(86) PCT No.: PCT/US2018/037981
§ 371 (c)(1),
(2) Date: Dec. 23, 2019

(87) PCT Pub. No.: WO2019/005513
PCT Pub. Date: Jan. 3, 2019

(65) Prior Publication Data

US 2020/0224774 A1 Jul. 16, 2020

Related U.S. Application Data

(63) Continuation of application No. 15/639,497, filed on Jun. 30, 2017, now Pat. No. 10,563,774.

(51) Int. Cl.
*A01C 7/08* (2006.01)
*F16K 3/02* (2006.01)
(Continued)

(52) U.S. Cl.
CPC ............ *A01C 7/088* (2013.01); *A01C 15/006* (2013.01); *B65G 53/16* (2013.01); *F16K 3/029* (2013.01);
(Continued)

(58) Field of Classification Search
CPC ......... A01C 7/081; A01C 7/082; A01C 7/084; A01C 7/088; A01C 7/102; A01C 15/006;
(Continued)

(56) References Cited

U.S. PATENT DOCUMENTS 4,267,859 A 5/1981 Dykzeul
5,014,730 A * 5/1991 Fye ...................... F16K 3/0227 137/454.2

(Continued)

FOREIGN PATENT DOCUMENTS

AU 2015213402 A1 9/2015
CA 2873245 A1 11/2013

(Continued)

OTHER PUBLICATIONS

Website: https://www.prnewswire.com/news-releases/amt-unveils-intellidrive-plus-ahead-of-farm-shows-winter-wheat-planting-300912970.html, Retreived Sep. 13, 2019, pp. 3.

(Continued)

*Primary Examiner* — David Colon-Morales

(57) ABSTRACT

A sectional control device controls the flow of particulate material from a meter assembly to a primary manifold of an air seeding system. The sectional control device includes a plate assembly having particulate openings extending between the meter assembly and the primary manifold and a shut-off mechanism configured to control the flow of the particulate material through the particulate openings. The shut-off mechanism includes a gate configured to slide between an open position, where particulate material can flow through the particulate opening, and a closed position, where particulate material is prevented from flowing through the particulate opening. The shut-off mechanism also includes an actuator configured to drive the gate between the open position and the closed position.

19 Claims, 16 Drawing Sheets

(51) Int. Cl.

| | |
|---|---|
| ***F16K 27/04*** | (2006.01) |
| ***F16K 27/00*** | (2006.01) |
| ***F16K 31/04*** | (2006.01) |
| ***A01C 7/04*** | (2006.01) |
| ***A01C 15/00*** | (2006.01) |
| ***B65G 53/16*** | (2006.01) |
| *A01C 15/04* | (2006.01) |

(52) U.S. Cl.

CPC .......... *F16K 3/0254* (2013.01); *F16K 3/0281* (2013.01); *F16K 27/003* (2013.01); *F16K 27/044* (2013.01); *F16K 31/047* (2013.01); *A01C 7/042* (2013.01); *A01C 7/081* (2013.01); *A01C 15/04* (2013.01)

(58) Field of Classification Search

CPC ....... A01C 7/042; F16K 3/0281; F16K 3/029; F16K 27/044; F16K 3/0254; F16K 31/047; F16K 31/04

See application file for complete search history.

(56) References Cited

U.S. PATENT DOCUMENTS

| | | | | |
|---|---|---|---|---|
| 5,234,196 | A | 8/1993 | Harris | |
| 5,324,143 | A * | 6/1994 | Sanders | B65G 53/4633 406/67 |
| 5,429,061 | A * | 7/1995 | Bourgeois | A01C 7/087 111/200 |
| 5,566,922 | A * | 10/1996 | Tanaka | F16K 3/188 251/157 |
| 5,775,585 | A * | 7/1998 | Duello | A01C 15/04 239/654 |
| 5,878,679 | A | 3/1999 | Gregor et al. | |
| 5,924,371 | A | 7/1999 | Flamme et al. | |
| 5,941,225 | A | 8/1999 | Tentler et al. | |
| 6,079,340 | A * | 6/2000 | Flamme | A01M 7/0089 111/178 |
| 6,122,581 | A | 9/2000 | McQuinn | |
| 6,386,128 | B1 * | 5/2002 | Svoboda | A01B 79/005 111/200 |
| 6,522,948 | B1 | 2/2003 | Benneweis | |
| 6,678,580 | B2 | 1/2004 | Benneweis | |
| 6,708,080 | B2 | 3/2004 | Benneweis | |
| 6,941,225 | B2 | 9/2005 | Upadhyaya et al. | |
| 7,555,990 | B2 * | 7/2009 | Beaujot | A01C 7/088 111/123 |
| 7,690,440 | B2 | 4/2010 | Dean et al. | |
| 8,001,915 | B2 | 8/2011 | Friggstad | |
| 8,132,521 | B2 | 3/2012 | Snipes et al. | |
| 8,141,504 | B2 | 3/2012 | Dean et al. | |
| 8,181,934 | B2 | 5/2012 | Schwartz et al. | |
| 8,214,111 | B2 | 7/2012 | Heiniger et al. | |
| 8,281,724 | B2 | 10/2012 | Snipes | |
| 8,371,238 | B2 | 2/2013 | Dean et al. | |
| 8,393,502 | B2 | 3/2013 | Renyer et al. | |
| 8,578,870 | B2 | 11/2013 | Beaujot | |
| 8,635,963 | B2 * | 1/2014 | Friggstad | A01C 7/088 111/175 |
| 8,683,931 | B1 | 4/2014 | Lafferty | |
| 8,825,311 | B2 * | 9/2014 | Kowalchuk | A01B 79/005 701/50 |
| 8,931,425 | B2 | 1/2015 | Friggstad | |
| 9,030,040 | B2 | 5/2015 | Tarasinski et al. | |
| 9,043,949 | B2 * | 6/2015 | Liu | A01C 7/107 |
| 9,119,338 | B2 | 9/2015 | Alsater et al. | |
| 9,148,990 | B2 | 10/2015 | Redman et al. | |
| 9,326,441 | B2 * | 5/2016 | Donadon | A01C 7/107 |
| 9,330,062 | B2 | 5/2016 | Thurow et al. | |
| 9,338,938 | B2 | 5/2016 | Cash et al. | |
| 9,363,942 | B2 | 6/2016 | Bent et al. | |
| 9,396,153 | B2 | 7/2016 | Peters et al. | |
| 9,591,800 | B2 * | 3/2017 | Kowalchuk | A01C 7/102 |
| 9,686,904 | B2 * | 6/2017 | Roszman | A01C 7/082 |
| 9,907,224 | B2 * | 3/2018 | Rosengren | G01C 21/30 |
| 9,924,627 | B1 * | 3/2018 | Beaujot | G01F 13/001 |
| 9,949,427 | B2 * | 4/2018 | Schweitzer | A01C 7/102 |
| 10,085,375 | B2 * | 10/2018 | Engel | A01C 7/046 |
| 10,375,876 | B2 | 8/2019 | Kordick | |
| 10,563,774 | B2 * | 2/2020 | Reich | F16K 27/003 |
| 2007/0181841 | A1 * | 8/2007 | Werner | F16K 3/0281 251/326 |
| 2008/0047475 | A1 | 2/2008 | Stehling et al. | |
| 2009/0079624 | A1 * | 3/2009 | Dean | A01C 7/084 342/357.52 |
| 2011/0083747 | A1 * | 4/2011 | Orino | F16K 31/508 137/1 |
| 2013/0221252 | A1 | 8/2013 | Eijkelenberg et al. | |
| 2013/0333601 | A1 * | 12/2013 | Shivak | G05D 7/0664 111/118 |
| 2014/0076218 | A1 | 3/2014 | Liu | |
| 2015/0052447 | A1 | 2/2015 | Ritesh | |
| 2015/0300507 | A1 * | 10/2015 | Goodwin | F16K 3/316 251/12 |
| 2016/0120097 | A1 | 5/2016 | Chahley et al. | |
| 2016/0120101 | A1 | 5/2016 | Zacharias et al. | |
| 2016/0120106 | A1 | 5/2016 | Zacharias et al. | |
| 2016/0330901 | A1 * | 11/2016 | Arnold | A01C 7/088 |
| 2017/0130577 | A1 * | 5/2017 | Cheng | F16K 37/0033 |
| 2019/0003600 | A1 | 1/2019 | Reich et al. | |

FOREIGN PATENT DOCUMENTS

| | | | |
|---|---|---|---|
| RU | 2043007 | C1 | 9/1995 |
| RU | 2530994 | C2 | 10/2014 |

OTHER PUBLICATIONS

International Search Report and Written Opinion for PCT Application No. PCT/US2018/037981, dated Sep. 26, 2018, pp. 12.

First Russian Office Action for RU Application No. 2020103504, dated Sep. 8, 2021, pp. 12.

* cited by examiner

SECTIONAL CONTROL DEVICE

BACKGROUND

This disclosure relates generally to air seeding devices. More particularly, this disclosure relates to sectional control devices for air seeding devices.

Air seeding devices utilize air to provide particulate material, such as seed or fertilizer, for application in a field. Air seeding devices provide greater coverage and distribution of particulate material, leading to higher crop yield. During the application process, meters are disposed at the exit of supply tanks, and the meters provide metered portions of particulate material into a pneumatic system. A fan blows air through a pneumatic system to entrain the particulate material in the air. The entrained particulate material is carried downstream through distribution lines, and is provided to an air seeder. The air seeder deposits the particulate material in the soil with applicators.

Air seeding devices can include multiple distribution lines that each distribute particulate material to certain applicators on the air seeder. Sectional control is a process whereby the particulate material is prevented from entering one or more distribution lines to prevent the particulate material from being applied by the applicators associated with the one or more distribution lines. Sectional control allows the user to control the distribution of particulate material by controlling which, if any, applicators receive particulate material at a given time.

SUMMARY

According to one aspect of the disclosure, a sectional control mechanism includes a chassis including a top side, a bottom side, and at least one gate aperture extending through the plate between the top side and the bottom side, a first plate assembly disposed on the top side of the chassis, a second plate assembly disposed on a bottom side of the chassis, and a shut-off mechanism. The first plate assembly includes at least one assembly receiving opening extending through the first plate assembly, the at least one assembly receiving opening is in communication with the at least one gate aperture. The second plate assembly includes at least one assembly supply opening extending through the second plate assembly, the at least one assembly supply opening is in communication with the at least one gate aperture. The shut-off mechanism is configured to control a flow of material to the at least one assembly supply opening from the at least one assembly receiving opening. The shut-off mechanism includes a gate slidably disposed in the at least one gate aperture, a motor connected to and powering the gate, and a screw extending between and connecting the motor and the gate, the screw configured to drive the gate between a closed position and an open position.

According to another aspect of the disclosure, a sectional control assembly for an air seeding system includes a plate assembly disposed between a meter assembly and a primary manifold, a housing mounted on the plate assembly, a shut-off mechanism at least partially disposed in the housing, and a controller disposed within the housing and connected to the shut-off mechanism, the controller configured to induce a movement of a gate between an open position and a closed position. The meter assembly is configured to meter a particulate material from a particulate material source, and the primary manifold configured to provide the particulate material to a pneumatic system for distribution through the air seeding system. The plate assembly includes a particulate opening extending therethrough, wherein the particulate material is configured to flow through the particulate opening between the meter assembly and the primary manifold. The shut-off mechanism includes a motor disposed in the housing, a screw extending from the motor within the housing, and a gate attached to the screw by an attachment assembly. The gate includes a radial portion disposed within the housing and connected to the attachment assembly, and an axial portion extending from the radial portion and out of the housing into the plate assembly. The gate is configured to slide between the open position, wherein the does not extend into the particulate opening, and the closed position, wherein gate extends into and obstructs the particulate opening.

DETAILED DESCRIPTION

Figure 1A:
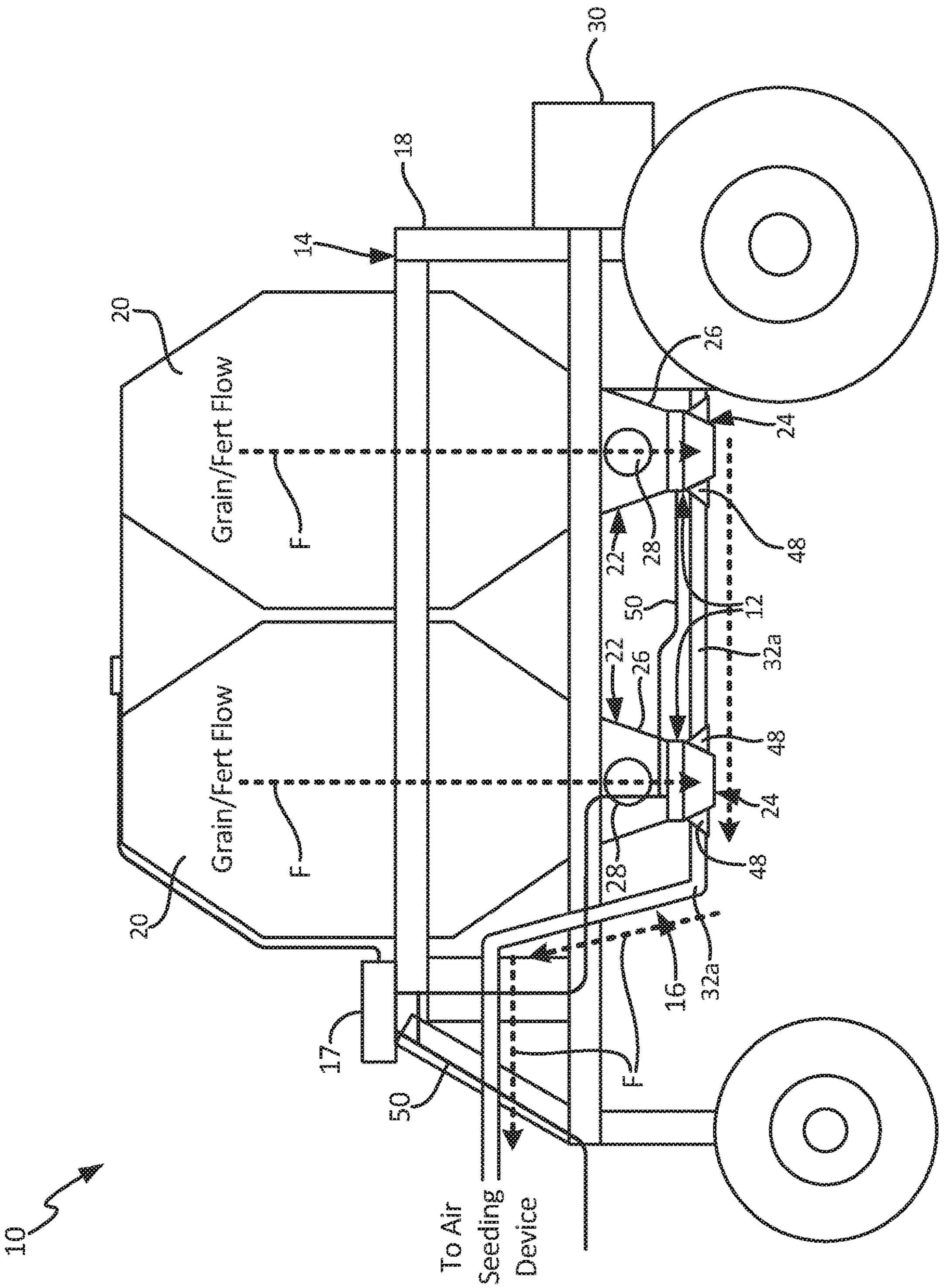
FIG. 1A is a schematic of an air seeding supply system.
Figure 1B:
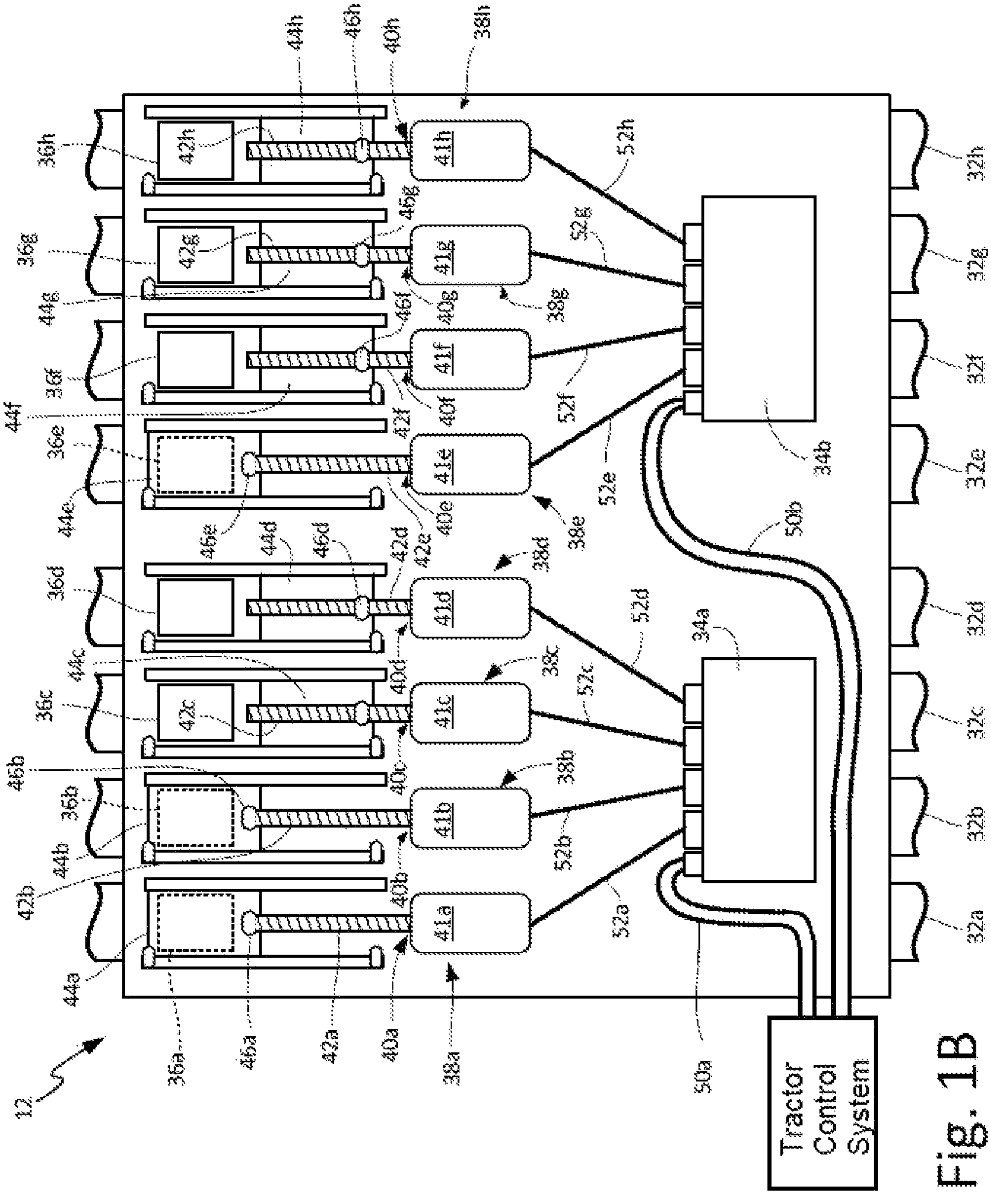
FIG. 1B is a top schematic view of a sectional control assembly.

FIG. 1A is a schematic of air seeding supply system 10. FIG. 1B is a schematic of sectional control assembly 12. Air seeding supply system 10 includes sectional control assemblies 12, air cart 14, pneumatic system 16, and power source 17. Air cart 14 includes frame 18, supply tanks 20, meter mechanisms 22, and primary manifolds 24. Meter mechanism 22 includes meter housing 26 and meter 28. Pneumatic system 16 includes fan 30 and distribution lines 32*a*-32*h* (distribution lines 32*b*-32*h* shown in FIG. 1B). Sectional control assembly 12 includes controllers 34*a* and 34*b*, particulate openings 36*a*-36*h*, and shut-off mechanisms 38*a*-38*h*. Shut-off mechanisms 38*a*-38*h* respectively include actuators 40*a*-40*h*, gates 44*a*-44*h*, and attachment assemblies 46*a*-46*h*. Actuators 40*a*-40*h* include motors 41*a*-41*h* and screws 42*a*-42*h*, respectively. Primary manifolds 24 include fittings 48.

Pneumatic system 16 and sectional control assemblies 12 are mounted on air cart 14. Supply tanks 20 are disposed on frame 18 of air cart 14. Supply tanks 20 are configured to house a particulate material, such as seed or fertilizer, prior to application to a field by an air seeding device, such as a seed drill. Meter mechanism 22 is mounted at a distribution opening of supply tank 20. Meter housing 26 is mounted below supply tank 20 and meter rollers 28 extends through meter housing 26. In some examples, meter rollers 28 can be configured to rotate about a meter axis and feed particulate material from supply tanks 20 to pneumatic system 16. Primary manifold 24 is mounted below meter housing 26 and is configured to receive the particulate material from meter mechanism 22. Fittings 48 extend upstream and downstream from primary manifold 24 and are configured to connect to distribution lines 32*a*-32*h*, respectively, and provide the particulate material to distribution lines 32*a*-32*h* for distribution through pneumatic system 16. While pneumatic system 16 is described as including distribution lines 32*a*-32*h*, it is understood that pneumatic system 16 can include as many or as few distribution lines 32 as desired.

Pneumatic system 16 can distribute the particulate material from supply tanks 20 to the air seeding device for application to a field, for example, by blowing air to entrain the particulate material and carry the entrained particulate material through distribution lines 32 to the air seeding device. Fan 30 is mounted on frame 18 and is configured to blow air through pneumatic system 16. Distribution lines 32*a*-32*h* extend from fan 30, connect to primary manifold 24 through fittings 48, which extend upstream and downstream from primary manifold 24, and extend downstream to the air seeding device. In some examples, each distribution line 32*a*-32*h* can include primary distribution lines and secondary distribution lines that branch from the primary distribution lines. For example, primary distribution lines can extend from air cart 14 to the air seeding device, and the primary distribution lines can branch into one or more secondary distribution lines at the air seeding device to provide the entrained particulate material to individual applicators on the air seeding device that are configured to apply the particulate material to the field.

Sectional control assembly 12 is mounted between meter mechanism 22 and primary manifold 24 and is configured to control the flow of particulate material to primary manifold 24 from meter mechanism 22. Particulate openings 36*a*-36*h* are disposed between meter mechanism 22 and primary manifold 24. The particulate material flows through particulate openings 36*a*-36*h* to reach distribution lines 32*a*-32*h* from supply tanks 20. While sectional control assembly 12 is described as including particulate openings 36*a*-36*h*, it is understood that sectional control assembly 12 can include as many or as few particulate openings 36 as desired. For example, where pneumatic system 16 includes four distribution lines 32, sectional control assembly 12 can include four particulate openings 36. Power source 17 is connected to one or more sectional control assemblies 12 and is configured to provide power to sectional control assemblies 12 to shift gates 44 between an open position and a closed position. For example, power source 17 can be a battery power pack charged from a vehicle, such as the tractor. As such, power source 17 can provide motive power to shut-off mechanisms 38 and can be recharged by the vehicle towing air seeding supply system 10. In some examples, power source 17 can be common to all sectional control assemblies 12.

Sectional control assembly 12 includes shut-off mechanisms 38*a*-38*h*, with each shut-off mechanism 38*a*-38*h* configured to control the flow of particulate material to one of distribution lines 32*a*-32*h*. Actuators 40*a*-40*h* are mounted within sectional control assembly 12 and are configured to drive gates 44*a*-44*h* between an open position and a closed position. Actuators 40*a*-40*h* can be of any suitable configuration for driving gates 44*a*-44*h* between the open position and the closed position. For example, actuators 40*a*-40*h* can include screws 42*a*-42*h* extending from motors 41-41*h*, respectively. Screws 42*a*-42*h* respectively drive the movement of gates 44*a*-44*h*. While actuators 40*a*-40*h* are described as including screws 42*a*-42*h*, it is understood that actuators 40*a*-40*h* can be of any suitable configuration for displacing gates 44. For example, actuators 40*a*-40*h* can include linear actuators such as a pneumatic drive, a hydraulic drive, or an electromechanical drive, where screw 42*a*-42*h* is linearly instead of rotationally driven.

Gates 44*a*-44*h* are connected to actuators 40*a*-42*h* by attachment assemblies 46*a*-46*h*. Each attachment assembly 46 can include internal threading configured to mesh with external threading on screw 42 such that rotating screw 42 causes attachment assembly 46, and thus gate 44, to displace linearly along screw 42. Controllers 34*a* and 34*b* of sectional control assembly 12 can communicate with an operator and/or a control system via communication links 50*a* and 50*b*, which can include a wired or wireless connection. Controller 34*a* is connected to and controls shut-off mechanisms 38*a*-38*d* via control links 52*a*-52*d*. Controller 34*b* is connected to and controls shut-off mechanisms 38*e*-38*h* via control links 52*e*-52*h*. Control links 52 can include a wired or wireless connection. It is further understood that controller 34*a* and controller 34*b* can control any desired number of shut-off mechanisms 38. Controllers 34*a* and 34*b* communicate with shut-off mechanisms 38*a*-38*h* to control a position of gates 44*a*-44*h* relative to particulate openings 36*a*-36*h*. While sectional control assembly 12 is described as including shut-off mechanisms 38*a*-38*h*, it is understood that sectional control assembly 12 can include as many or as few shut-off mechanisms 38 as required to control flow to distribution lines 32.

Each gate 44*a*-44*h* of sectional control assembly 12 can be placed in a closed position, shutting off the flow of particulate material to primary manifold 24, in an open position, allowing a full flow of particulate material to primary manifold 24, or any desired intermediate position allowing a partial flow of particulate material. Sectional control assembly 12 controls the flow of particulate material to each distribution line 32*a*-32*h* and can shut off the flow of particulate material to one or more distribution lines 32*a*-32*h* to control which distribution lines 32*a*-32*h* receive particulate material at a given time. As such, sectional control assembly 12 can be utilized to prevent over-application of particulate material in portions of the field that have already received the particulate material.

During operation, air seeding supply system 10 is attached to a toolbar, such as the air seeding device, and the toolbar applies the particulate material, such as seed and/or fertilizer, to the field. It is understood, that the toolbar can be a tow-between or a tow-behind toolbar, such that air seeding supply system 10 can be one of between a vehicle, such as a tractor, and the toolbar or behind the vehicle and the toolbar. The toolbar includes applicators, which can be of any suitable configuration for applying the particulate material to the field, that are connected to pneumatic system 16 and are configured to receive the particulate material from pneumatic system 16 and apply the particulate material to the field. Air cart 14 stores the particulate material in supply tanks 20 prior to application, and pneumatic system 16 conveys the particulate material from air cart 14 to the air seeding device. As shown by arrow F, the particulate material flows from supply tanks 20, through meter mechanism 22 and sectional control assembly 12, and to primary manifold 24. From primary manifold 24, the particulate material is driven to the toolbar through distribution lines 32.

Supply tanks 20 are loaded with the particulate material. Meter rollers 28 rotate within meter housings 26 to pull the particulate material from supply tanks 20 and provide the particulate material to primary manifolds 24. Meter rollers 28 can be configured to meter a set portion of the particulate material with each rotation of meter rollers 28. For example, meter rollers 28 can include flutes that pull a desired volume of particulate material from supply tanks 20 with each rotation. In one example, each meter roller 28 is configured to provide a set weight of material per rotation, and the speed of rotation varies with the ground speed to control the supply of particulate material. The particulate material passes through sectional control assembly 12 and into the portion of each distribution line 32*a*-32*h* extending into primary manifold 24. The air stream within distribution lines 32*a*-32*h* entrains the particulate material and carries the particulate material downstream from primary manifolds 24 to the air seeding device. Fan 30 is disposed at a distal end of distribution lines 32 and is configured to blow air through distribution lines 32 to drive the particulate material from primary manifolds 24 to the air seeding device.

Sectional control assemblies 12 are disposed between meter mechanisms 22 and primary manifolds 24. Particulate openings 36*a*-36*h* provide a flowpath for particulate material between meter mechanism 22 and primary manifold 24 before entering distribution lines 32*a*-32*h*.

In FIG. 1B, gates 44*c*-44*d* and 44*f*-44*h* are depicted in an open position such that particulate openings 36*c*-36*d* and 36*f*-36*h* are unobstructed and particulate material is able to flow to distribution lines 32*c*-32*d* and 32*f*-32*h*. Gates 44*a*-44*b* and 44*e* are depicted in a closed position such that gates 44*a*-44*b* and 44*e* obstruct particulate openings 36*a*-36*b* and 36*c* and particulate material is prevented from flowing to distribution lines 32*a*-32*b* and 32*e*. It is understood, however, that each gate 44 can be positioned in an intermediate position between the open position and the closed position such that gates 44 partially obstruct particulate openings 36 and allow a limited flow of the particulate material to distribution lines 32.

To open or close particulate openings 36*a*-36*h*, one of controllers 34*a* and 34*b* can provide command signals to cause actuator 40 to shift gate 44 between the various positions. For example, controller 34*a* can command actuator 40*a* to position gate 44*a* in a desired position, such as the open position, the closed position, or an intermediate position. In one example, motor 41*a* can then drive gate 44*a* between the open position and the closed position by driving rotation of screw 42*a*. Rotating screw 42*a* causes attachment assembly 46*a* to displace along a length of screw 42*a*. As attachment assembly 46*a* traverses along the length of screw 42*a*, attachment assembly 46*a* causes gate 44*a* to similarly displace relative to screw 42*a* due to the connection of attachment assembly 46*a* and gate 44*a*. Motors 41*a*-41*h* can be of any suitable configuration for driving screws 42*a*-42*h* and gates 44*a*-44*h*, such as brushed DC motors, for example. In another example, actuator 40*a* includes a cylinder, such as a pneumatic, hydraulic, or electromechanical cylinder. For example, actuator 40*a* can be an electromechanical cylinder, which can be a self-contained ball or roller screw driven by an electric motor to provide linear displacement.

Sectional control assemblies 12 allow the operator of air seeding supply system 10 to control the flow of particulate material to the air seeding device. Controlling the flow of particulate material prevents over-application of the particulate material by blocking the flow of the particulate material to certain applicators, thereby preventing the applicators from reapplying the particulate material in areas the particulate material was already applied. For example, sectional control assemblies 12 can communicate with a control system on the tractor, represented schematically in FIG. 1B, to determine the location of air seeding supply system 10 relative to portions of the field that have already had particulate material applied, such as via GPS, GNSS, and/or GPS/RTK, for example. The control system on the tractor can then command, via communication link 50 and controllers 34*a* and 34*b* for example, individual shut-off mechanisms 38 to shift individual gates 44 open or closed based on a location of air seeding supply system 10 in the field, thereby controlling the flow of particulate material through each particulate opening.

Sectional control assembly 12 can be a self-contained, retrofittable unit to convert air cart 14 from an air cart that continuously supplied particulate material to an air cart with sectional control capabilities such that the flow of the particulate material to each distribution line 32 can be controlled. During a retrofit, primary manifold 24 is detached from meter housing 26. Sectional control assembly 12 is inserted between primary manifold 24 and meter housing 26, and primary manifold 24 is reattached to meter housing 26 with fasteners that can extend through sectional control assembly 12. As such, sectional control assembly 12 can be easily retrofit into an existing air cart 14 to provide sectional control capabilities to that air cart.

Sectional control assembly 12 provides significant advantages. Sectional control assembly 12 provides on/off control for the flow of particulate material to the air seeding device, thereby preventing over-application in areas of a field that the air seeding device has already traversed. Preventing over-application also saves material costs by eliminating waste of particulate material. Sectional control assembly 12 can be retrofit onto an air cart by merely detaching primary manifold 24 from meter housing 26, inserting sectional control assembly 12 between the existing primary manifold 24 and meter housing 26, and reattaching primary manifold 24 to meter housing 26. As such, sectional control assembly 12 provides low cost, easily installed sectional control capabilities to air carts that were not previously equipped with sectional control capabilities.

Figure 2A:
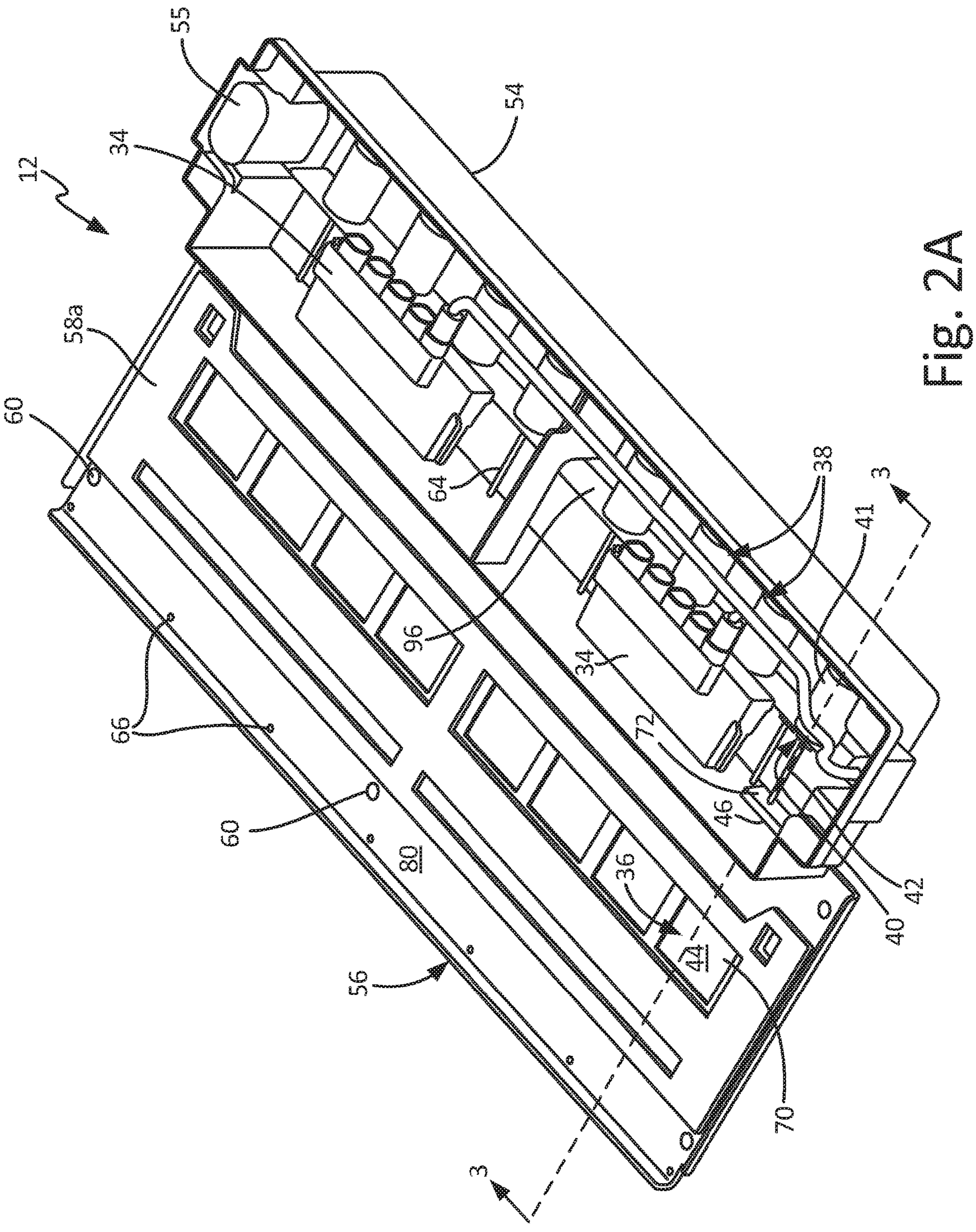
FIG. 2A is a perspective view of a sectional control device.
Figure 2B:
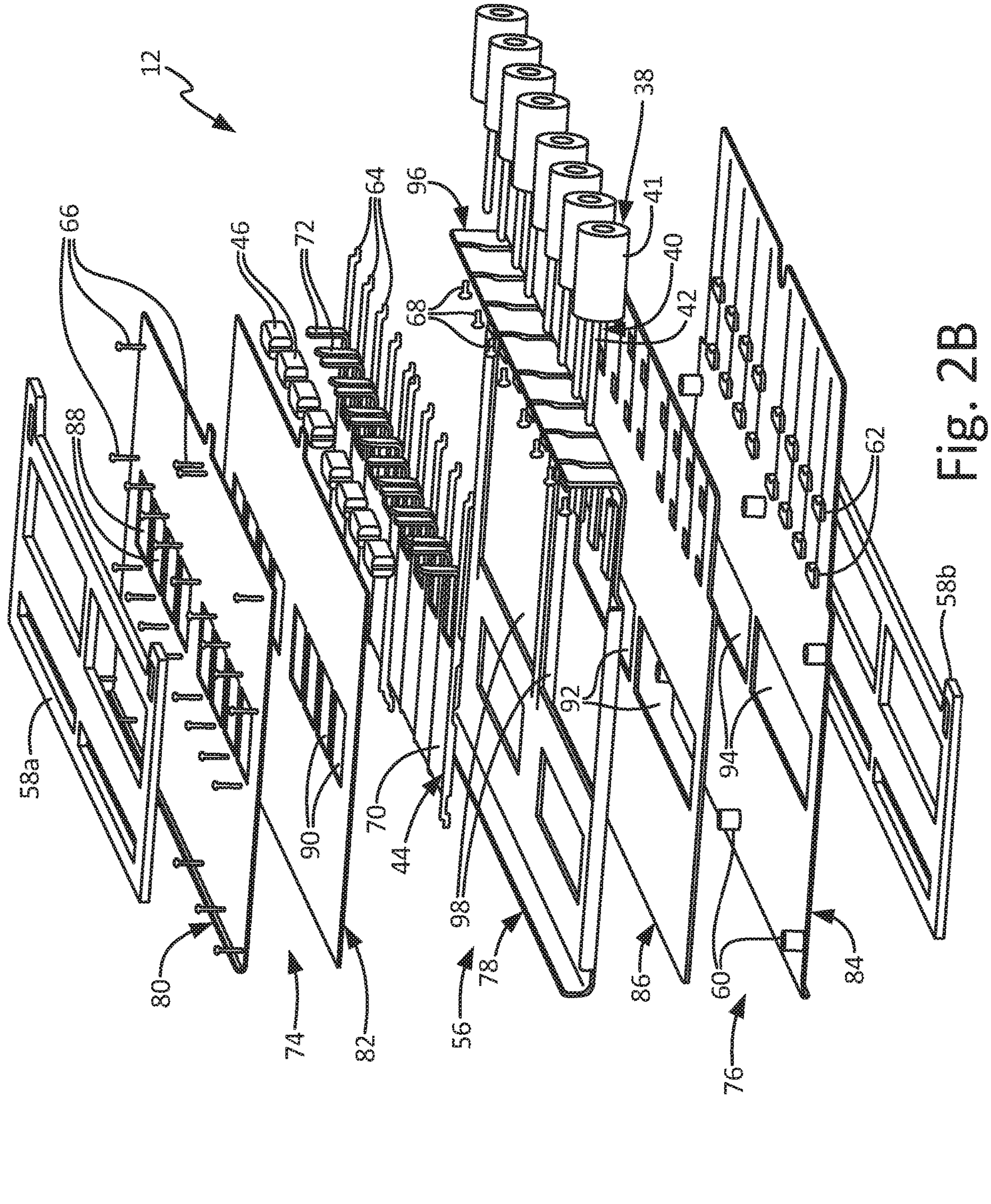
FIG. 2B is an exploded perspective view of a sectional control device.

FIG. 2A is a perspective view of sectional control assembly 12 showing shut-off mechanisms 38 in the closed position. FIG. 2B is an exploded view of sectional control assembly 12. Sectional control assembly 12 includes controllers 34, shut-off mechanisms 38, housing 54, plate assembly 56, gaskets 58*a* and 58*b*, bushings 60, switches 62, spacers 64, plate fasteners 66, and actuator fasteners 68. Each shut-off mechanism 38 includes actuator 40, gate 44, and attachment assembly 46. Each actuator 40 includes motor 41 and screw 42. Each gate 44 includes axial portion 70 and radial portion 72. Housing 54 includes filter assembly 55. Plate assembly 56 includes upper plate assembly 74, lower plate assembly 76, and chassis 78. Upper plate assembly 74 includes first outer plate 80 and first intermediate plate 82. Lower plate assembly 76 includes second outer plate 84 and second intermediate plate 86. First outer plate 80 includes outer particulate receiving openings 88. First intermediate plate 82 includes inner particulate receiving openings 90. Second intermediate plate 86 includes inner particulate supply openings 92. Second outer plate 84 includes outer particulate supply openings 94. Chassis 78 includes mounting flange 96 and gate apertures 98.

Housing 54 is mounted on and supported by plate assembly 56. Controllers 34 and shut-off mechanisms 38 are disposed within housing 54. Housing 54 is configured to protect controllers 34, shut-off mechanism 38, and other components of sectional control assembly 12 from contaminants during operation. Filter assembly 55 is disposed within housing 54 and is configured to filter air utilized to pressurize housing 54 during operation. Pressurizing housing 54 prevents the particulate material and other contaminants from entering housing 54 during operation. Filter assembly 55 filters the pressurized air prevent any contaminants entrained in the pressurized air from entering housing 54.

Chassis 78 and lower plate assembly 76 extend into housing 54, and housing 54 is attached to lower plate assembly 76. Upper plate assembly 74 is disposed on a top of chassis 78 and lower plate assembly 76 is disposed on a bottom of chassis 78. First intermediate plate 82 is disposed on a top side of chassis 78, and first outer plate 80 is disposed on first intermediate plate 82. Second intermediate plate 86 is disposed on a bottom side of chassis 78, and second outer plate 84 is disposed on second intermediate plate 86. Plate fasteners 66 extend through each of first outer plate 80, first intermediate plate 82, chassis 78, second intermediate plate 86, and second outer plate 84 to secure plate assembly 56 together.

Gasket 58*a* is disposed on first outer plate 80, and gasket 58*b* is disposed on second outer plate 84. Gasket 58*a* is configured to seal an interface between sectional control assembly 12 and meter housing 26 (shown in FIG. 1A). Gasket 58*b* is configured to seal an interface between sectional control assembly 12 and primary manifold 24 (shown in FIG. 1A). Bushings 60 extend through and align plate assembly 56. Bushings 60 can limit compression of sectional control assembly 12 between meter housing 26 and primary manifold 24. It is understood, that bushings 60 can be secured to second outer plate 84, such as by welding bushings 60 to second outer plate 84, or can be in a floating configuration. Where bushings 60 are in a floating configuration, each bushing 60 can include a snap ring attached to bushing 60 to maintain a position of each bushing 60 within sectional control assembly 12 and through lower plate assembly 76, chassis 78, and upper plate assembly 74. Limiting compression when sectional control assembly 12 is installed between meter housing 26 and primary manifold 24 can prevent damage to gaskets 58*a* and 58*b*. Moreover, bushings 60 prevent a user from overtightening sectional control assembly 12, which can bind gates 44 within plate assembly 56 such that gates 44 are prevented from sliding between the open position and the closed position.

Each shut-off mechanism 38 is at least partially disposed in housing 54, with gate 44 extending into plate assembly 56. Each actuator 40 is at least partially disposed in housing 54. Actuator fasteners 68 extends through mounting flange 96 of chassis 78 and attach actuators 40 to chassis 78. In some examples, actuator fasteners 68 connect motor 41 to chassis 78. Screws 42 extend from motors 41 through mounting flange 96. Screws 42 are disposed within housing 54, but it is understood that, in some examples, screws 42 can extend outside of housing 54. Attachment assemblies 46 are disposed on screws 42 and configured to be driven by screws 42. Gates 44 are connected to screws 42 through attachment assemblies 46. Radial portion 72 of each gate 44 extends from axial portion 70 and is connected to attachment assembly 46. Axial portion 70 of each gate 44 extends into plate assembly 56 between upper plate assembly 74 and lower plate assembly 76. Axial portion 70 is disposed in gate apertures 98 such that axial portion 70 is coplanar with chassis 78. Actuator 40 can displace gate 44 by rotating of screw 42 with motor 41. Rotating screw 42 causes attachment assembly 46 to displace axially along screw 42, thereby simultaneously causing gate 44 to displace axially along screw 42.

Spacers 64 are disposed beside each gate 44. Spacers 64 axially align gates 44 within plate assembly 56. Spacers 64 can also provide compression protection between first intermediate plate 82 and second intermediate plate 86. Spacers 64 maintain a minimum gap in gate apertures 98 when plate assembly 56 is fastened together by plate fasteners 66. The minimum gap prevents upper plate assembly 74 and lower plate assembly 76 from exerting a clamping force on gates 44. Spacers 64 thereby ensure that gates 44 are able to slide between the open position and the closed position.

Switches 62 are disposed on second outer plate 84, and can extend through second intermediate plate 86 and project through chassis 78. Switches 62 can be configured to sense a position of attachment assemblies 46, thereby sensing a position of gates 44. In some examples, the locational information provided by switch 62 can be utilized to stop motor 41, thereby stopping movement of gate 44, when switch 62 senses that gate 44 is in a desired position. In some examples, switches 62 can provide feedback as to whether the gate 44 has reached the desired position. Switches 62 can be of any desired configuration, including mechanical limit switches and proximity sensors, such as magnetic proximity sensors.

Outer particulate receiving openings 88, inner particulate receiving openings 90, gate apertures 98, inner particulate supply openings 92, and outer particulate supply openings 94 align to form particulate openings 36. In some examples, first outer plate 80 includes partitions between adjacent outer particulate receiving openings 88 and first intermediate plate 82 includes partitions between adjacent inner particulate receiving openings 90. Providing a partition between each first outer opening 88 can prevent particulate material from migrating to an adjacent first outer opening 88 when one first outer opening 88 is closed by gate 44. It is understood, however, that first outer plate 80 and first intermediate plate 82 can include as many or as few openings and partitions as desired. Gasket 58*a* and gasket 58*b* also include openings therethrough that align with particulate openings 36. Outer particulate receiving openings 88 and inner particulate receiving openings 90 can receive particulate material from meter 28 regardless of a position of gates 44.

Each shut-off mechanism 38 controls a flow of particulate material through a particulate opening 36. During operation, controllers 34 can communicate with shut-off mechanisms 38 and can command each shut-off mechanism 38 to allow or prevent the flow of particulate material through particulate openings 36. For example, in response to a command to shift gate 44 from an open position to a closed position, actuator 40 can drive the displacement of gate 44. In one example, motor 41 can activate screw 42, and screw 42 drives attachment assembly 46 along a length of screw 42. Gate 44 displaces axially relative to screw 42 due to attachment assembly 46 connecting gate 44 to screw 42. Screw 42 drives gate 44 until axial portion 70 is disposed between first intermediate opening 90 and second intermediate opening 92, thereby preventing particulate material from flowing through the particulate opening 36 associate with gate 44. The position of each gate 44 can be individually controlled by each motor 41 such that the flow of particulate material through each particulate opening 36 can be individually controlled.

Figure 3:
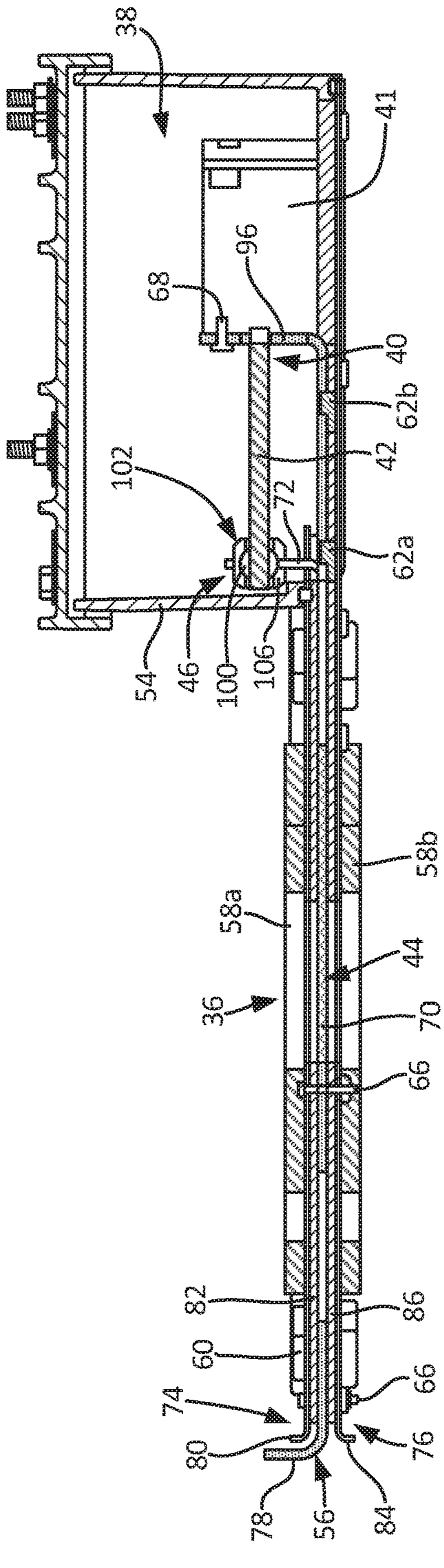
FIG. 3 is a cross-sectional view of the sectional control device of FIG. 2A taken along line 3-3 in FIG. 2A.

FIG. 3 is a cross-sectional view of sectional control assembly 12 taken along line 3-3 in FIG. 2A. Shut-off mechanism 38, housing 54, plate assembly 56, gaskets 58*a* and 58*b*, bushings 60, switches 62*a* and 62*b*, plate fasteners 66, and actuator fastener 68 of sectional control assembly 12 are shown. Shut-off mechanism 38 includes actuator 40, gate 44, and attachment assembly 46. Actuator 40 includes motor 41 and screw 42. Gate 44 includes axial portion 70 and radial portion 72. Attachment assembly 46 includes nut 100 and connector 102. Connector 102 includes first portion 104 and second portion 106. Plate assembly 56 includes upper plate assembly 74, lower plate assembly 76, and chassis 78. Upper plate assembly 74 includes first outer plate 80 and first intermediate plate 82. Lower plate assembly 76 includes second outer plate 84 and second intermediate plate 86. Chassis 78 includes mounting flange 96.

Housing 54 is mounted on and supported by plate assembly 56. Chassis 78 and lower plate assembly 76 extend into housing 54, and housing 54 is attached to lower plate assembly 76. Upper plate assembly 74 is disposed on a top of chassis 78 and lower plate assembly 76 is disposed on a bottom of chassis 78. First intermediate plate 82 is disposed on a top side of chassis 78, and first outer plate 80 is disposed on first intermediate plate 82. Second intermediate plate 86 is disposed on a bottom side of chassis 78, and second outer plate 84 is disposed on second intermediate plate 86. Gasket 58*a* is disposed on first outer plate 80, and gasket 58*b* is disposed on second outer plate 84. Bushings 60 extend through and align plate assembly 56 and can also limit compression of sectional control assembly 12 by meter housing 26 (shown in FIG. 1A) and primary manifold 24 (shown in FIG. 1A). Particulate opening 36 extends through plate assembly 56.

Shut-off mechanism 38 is at least partially disposed in housing 54. Actuator 40 is disposed in housing 54. Actuator fastener 68 extends through mounting flange 96 into motor 41 to attach motors 41 to chassis 78. It is understood, however, that actuator 40 can be secured to sectional control assembly 12 in any suitable manner, such as with bands, screws, and hook and loop fasteners, among others. Screw 42 extends from motor 41 through mounting flange 96. Screw 42 is disposed within housing 54, but it is understood that, in some examples, screw 42 can extend outside of housing 54. Attachment assembly 46 is disposed on screw 42 and is configured to be driven by screw 42. Nut 100 is disposed on and connected to screw 42. Nut 100 can include internal threading configured to mate with external threading on screw 42. First portion 104 is attached to second portion 106 to form connector 102, and connector 102 captures nut 100 between first portion 104 and second portion 106. Gate 44 extends from attachment assembly 46 and into plate assembly 56, with axial portion 70 of gate 44 disposed between upper plate assembly 74 and lower plate assembly 76. Axial portion 70 of gate 44 is coplanar with chassis 78 and disposed adjacent first intermediate plate 82 and second intermediate plate 86. With gate 44 disposed between first intermediate plate 82 and second intermediate plate 86, first intermediate plate 82 and second intermediate plate 86 can prevent gate 44 from displacing radially. When closing, the leading edge of axial portion 70 slides underneath the corresponding opening edges of openings in first outer plate 80 and first intermediate plate 82, such that particulate material that could otherwise be trapped or crushed by the leading edge of axial portion 70, thereby impeding complete closure of gate 44, is wiped off of axial portion 70. The plates, such as first intermediate plate 82 and second intermediate plate 86, can include a device, such as a gasket, a rope, a brush, or any other suitable device, disposed proximate the location where axial portion 70 of gate 44 extends into particulate opening 36 to wipe particulate material off of gate 44 and clean gate 44. Radial portion 72 of gate 44 extends from axial portion 70 and is connected to connector 102. As such, gate 44 is connected to screw 42 through attachment assembly 46.

Switches 62 are disposed on second outer plate 84, extend through second intermediate plate 86, and project through chassis 78. In some examples, each shut-off mechanism 38 is associate with a pair of switches, such as switches 62*a* and 62*b*. For example, switch 62*a* can be tripped when gate 44 reaches a forward-most limit of travel, and switch 62*b* can be tripped when gate 44 reaches an aft-most limit of travel. It is understood, however, that each shut-off mechanism 38 can be associated with as many or as few switches as desired. For example, shut-off mechanism 38 can include intermediary switches configured to denote a 25% open position, a 50% open position, a 75% open position, or any other desired position. Switches 62 can be of any desired configuration. For example, switches 62*a* and 62*b* can be mechanical switches triggered by the displacement of gates 44 or proximity sensors and can be configured to indicate the position of gates 44. In one example, switches 62 can be magnetic proximity sensors configured to sense a magnetic field of a magnet, such as a magnet mounted in attachment assemblies 46, for example.

During operation, shut-off mechanism 38 can be commanded to allow or prevent the flow of particulate material through particulate opening 36. For example, in response to a command to shut off the flow of particulate material to distribution line 32*a* (shown in FIG. 1B), a control signal can be provided, such as by controller 34*a* or controller 34*b*, for example, to shut-off mechanism 38 to cause shut-off mechanism 38 to shift gate 44 to a closed position. In response to the control signal, actuator 40 initiates and drives gate 44 to the closed position. In one example, motor 41 activates and drives a rotation of screw 42, screw 42 rotates and drives nut 100 due to the threaded connection between screw 42 and nut 100, and gate 44 shifts axially relative to screw 42 due to connector 102 connecting gate 44 to nut 100. In one example, actuator 40 drives gate 44 until an increase in current to motor 41 is detected. The increase in current indicates that gate 44 has reached a hard stop and is thus fully closed, and motor 41 can be deactivated in response to the increased current. In some examples, screw 42 drives gate 44 until switch 62*a* is tripped by connector 102, thereby indicating that gate 44 is in the closed position (shown in FIG. 2B). Switch 62*a* can deactivate motor 41 in response to being tripped by connector 102, thereby stopping the motion of gate 44. With gate 44 in the closed position, particulate opening 36 is obstructed by gate 44 thereby preventing the particulate material from flowing through particulate openings 36.

Shut-off mechanism 38 can similarly shift gate 44 to an open position, thereby allowing flow of the particulate material through particulate opening 36. For example, in response to a command to allow the flow of particulate material to distribution line 32, a control signal can be provided to shut-off mechanism 38, such as by controller 34*a* or controller 34*b*, for example, to cause shut-off mechanism 38 to shift gate 44 to an open position. Actuator 40 can drive gate back to the open position. For example, motor 41 can drive screw 42 in the opposite direction than when shifting gate 44 to the closed position. While screw 42 is described as rotating in opposite directions, it is understood that screw 42 can be configured to be driven in a single rotational direction to drive gate 44 to both the open position and the closed position, such as where screw 42 is a self-reversing screw, for example. Screw 42 rotates and drives nut 100 along a length of screw 42, thereby causing gate 44 to simultaneously shift axially relative to screw 42. In one example, actuator 40 drives gate 44 until an increase in current to motor 41 is detected. The increase in current indicates that gate 44 has reached a hard stop and is thus fully opened, and motor 41 can be deactivated in response to the increased current. In some examples, screw 42 continues to drive gate 44 until switch 62*b* is tripped by connector 102, thereby indicating that gate 44 is in the open position. Switch 62*b* can deactivate motor 41 in response to being tripped by connector 102, thereby stopping the rearward motion of gate 44 with gate 44 in the open position. With gate 44 in the open position, the particulate material is able to flow thorough the particulate opening 36 associated with gate 44.

It is understood that shut-off mechanism 38 can be activated or deactivated in any desired manner. For example, shut-off mechanism 38 can include switches 62 that are triggered by gate 44 reaching a desired location, and triggering switch 62 can deactivate actuator 40. While switches 62 are described as discrete switches, it is understood that switches 62 can also include a continuous sensor, including a contact or non-contact sensor, configured to continuously monitor a location of gate 44. In another example, shut-off mechanism 38 can include an encoder monitoring a component of shut-off mechanism 38, such as the rotations of screw 42 or motor 41, to determine an exact position of gate 44 relative to particulate opening 36. The encoder can thus provide precise locational information for gate 44 that can be used to position gate at the open position, the closed position, or any intermediate position between the open position and the closed position. In some examples, the encoders can self-calibrate shut-off mechanisms 38, such that controller 34 causes the gate 44 to shift to the fully open or fully closed position and the encoder count is reset. Moreover, the user can be notified of any error sensed by the encoders, such that an error is provided to the user if the encoder senses that actuator 40 has not displaced gate 44 to the desired position. In another example, the energy supply to actuator 40 can be monitored for a change indicative of gate 44 reaching the open position or the closed position. For example, an increase in current at motor 41 can indicate that gate 44 has reached a travel limit, and the increase in current can be sensed and motor 41 can be deactivated in response to the increase in current.

Sectional control assembly 12 provides significant advantages. Sectional control assembly 12 is a self-contained sectional control unit that can be retrofit onto an existing air cart, such as air cart 14 (shown in FIG. 1A), to provide sectional control capabilities to that air cart, thereby reducing costs and labor. Sectional control assembly 12 can facilitate variable rate supply of the particulate material on a per-section basis. Housing 54 enclosed shut-off mechanisms 38 and controllers 34 to protect both from the environment. Shut-off mechanisms 38 allow individual particulate openings 36 to be controlled to either allow or prevent a flow of particulate material through that individual particulate opening 36. Gate 44 is positioned between top plate assembly 56 and bottom plate assembly 56 such that gate 44 is not exposed to the environment unless gate 44 is positioned within particulate opening 36. Positioning gate 44 between top plate assembly 56 and bottom plate assembly 56 retains gate 44 in the desired position throughout the course of operation. Moreover, screw 42 can position gate 44 at any desired location relative to particulate opening 36 to allow no flow, full flow, or an intermediate flow of particulate material.

Figure 4:
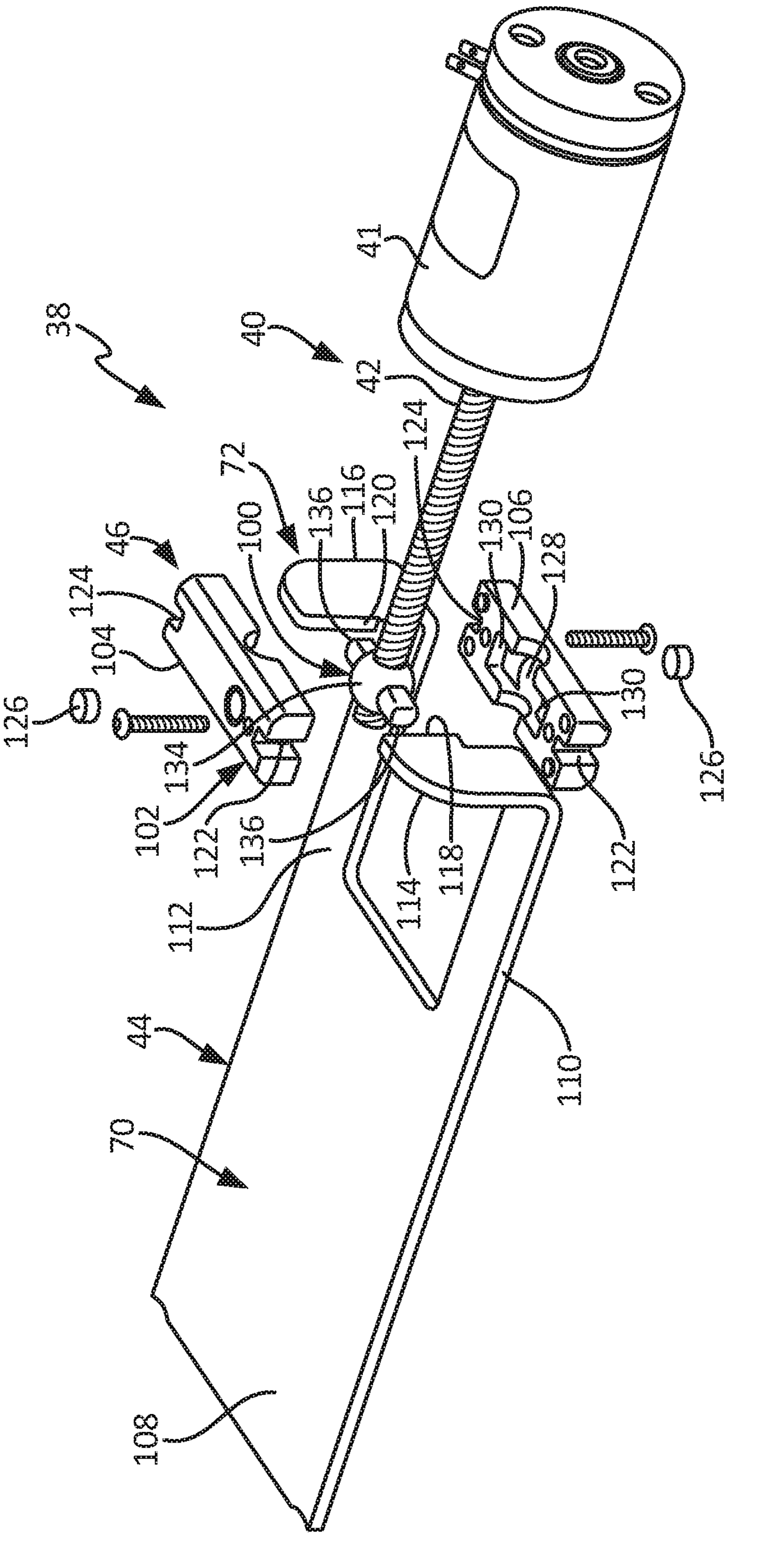
FIG. 4 is an exploded perspective view of a sectional control device shut-off assembly.

FIG. 4 is an exploded, perspective view of shut-off mechanism 38. Shut-off mechanism 38 includes actuator 40, gate 44, and attachment assembly 46. Actuator 40 includes motor 41 and screw 42. Gate 44 includes axial portion 70 and radial portion 72. Axial portion 70 includes flow blocker 108, first axial leg 110, and second axial leg 112. Radial portion 72 includes first radial arm 114 and second radial arm 116. First radial arm 114 includes first flange 118 and second radial arm 116 includes second flange 120. Attachment assembly 46 includes nut 100 and connector 102. Connector 102 includes first portion 104, second portion 106, first groove 122, second groove 124, magnets 126, body receiving portion 128, wing slots 130, and fasteners 132. Nut 100 includes body 134 and wings 136.

Screw 42 is connected to and extends from motor 41. Body 134 of nut 100 is disposed on screw 42, and wings 136 extend radially from body 134. Body 134 can include internal threading configured to mate with external threading of screw 42 such that rotating screw 42 causes nut 100 to displace axially along screw 42. Nut 100 is captured by connector 102 and retained between first portion 104 and second portion 106. Body 134 is retained within body receiving portion 128, and wings 136 are retained within wing slots 130. Body 134 can be spherical such that body 134 can provide a knuckle joint with connector 102 between screw 42 and gate 44. As such, body 134 provides flexibility to account for any misalignment between screw 42 and gate 44. Magnets 126 extend into first portion 104 and second portion 106. First portion 104 and second portion 106 can be identical to provide mistake-proofing, such that either first portion 104 or second portion 106 can form either the uppermost portion or the lowermost portion of connector 102. Fasteners 132 extend through and connect first portion 104 and second portion 106 together to form connector 102. As shown, first portion 104 and second portion 106 can be identical, such that either first portion 104 and second portion 106 can be positioned above screw 42, and thereby providing mistake-proofing to attachment assembly 46.

Attachment assembly 46 connects screw 42 and gate 44 and transmits forces therebetween such that screw 42 drives gate 44 through attachment assembly 46. Radial portion 72 of gate 44 is configured to connect to attachment assembly 46, and axial portion 70 of gate 44 is configured to shift between an open position and a closed position to either allow or block the flow of particulate material through particulate openings 36 (best seen in FIG. 1B). First radial arm 114 extends radially from first axial leg 110, and second radial arm 116 extends radially from second axial leg 112. First flange 118 is disposed at a distal end of first radial arm 114 and projects towards second radial arm 116. Second flange 120 is disposed at a distal end of second radial arm 116 and projects toward first radial arm 114. First flange 118 can extend into and engage first groove 122 of connector 102, and second flange 120 can similarly extend into and engage second groove 124 of connector 102. As such, gate 44 is connected to attachment portion by first flange 118 and second flange 120. First groove 122 and second groove 124 engage first flange 118 and second flange 120 axially, but allow for radial movement of first flange 118 and second flange 120. In this way, first groove 122 and second groove 124 allow connector 102 to translate radially relative to first radial arm 114 and second radial arm 116, thereby account for any tolerances and misalignment that can occur between screw 42 and gate 44.

Axial portion 70 of gate 44 extends from radial portion 72. First axial leg 110 extends from first radial arm 114, and second axial leg 112 extends from second radial arm 116. First axial leg 110 and second axial leg 112 define a gap therebetween, and the gap can receive a portion of chassis 78 (best seen in FIG. 7) to maintain an alignment of gate 44 within gate aperture 98. Flow blocker 108 extends from first axial leg 110 and second axial leg 112 and is configured to block the flow of particulate material through particulate opening 36 (best seen in FIG. 1B) when gate 44 is in the closed position.

During operation, gate 44 is driven between an open position, where particulate material can flow past gate 44 and into primary manifold 24 (shown in FIG. 1A), and a closed position, wherein gate 44 blocks the flow of particulate material to primary manifold 24 through sectional control assembly 12 (shown in FIGS. 1A-3). Gate 44 can also be positioned at any intermediate position between a fully open position and a fully closed position.

Motor 41 rotatably drives screw 42 in response to the command signal. Rotating screw 42 causes nut 100 to translate along a length of screw 42 due to the connection of body 134 and screw 42. Nut 100 carries connector 102 along the length of screw 42 due to connector 102 capturing wings 136 in wing slots 130 and body 134 in body receiving portion 128. Connector 102 displaces gate 44 due to the connection of first flange 118 with first groove 122 and of second flange 120 with second groove 124. Magnets 126 disposed in connector 102 can be sensed by a proximity sensor, such as switches 62*a* and 62*b* (best seen in FIG. 3), to indicate a location of gate 44 relative to any particulate opening.

Shut-off mechanism 38 provides significant advantages. Screw 42 can drive gate 44 both forward and backwards by simply rotating, and screw 42 also allows gate 44 to be positioned at any intermediate position between fully opened and fully closed. As such, screw 42 allows for variable rate supply of the particulate material. First portion 104 and second portion 106 can be identical, which allows connector 102 to be reversible, provides mistake-proofing, and reduces costs associate with shut-off mechanism 38. Moreover, gate 44 is attached to attachment assembly 46 by first flange 118 and second flange 120, which provides for a simple attachment process requiring minimal parts and labor.

Figure 5:
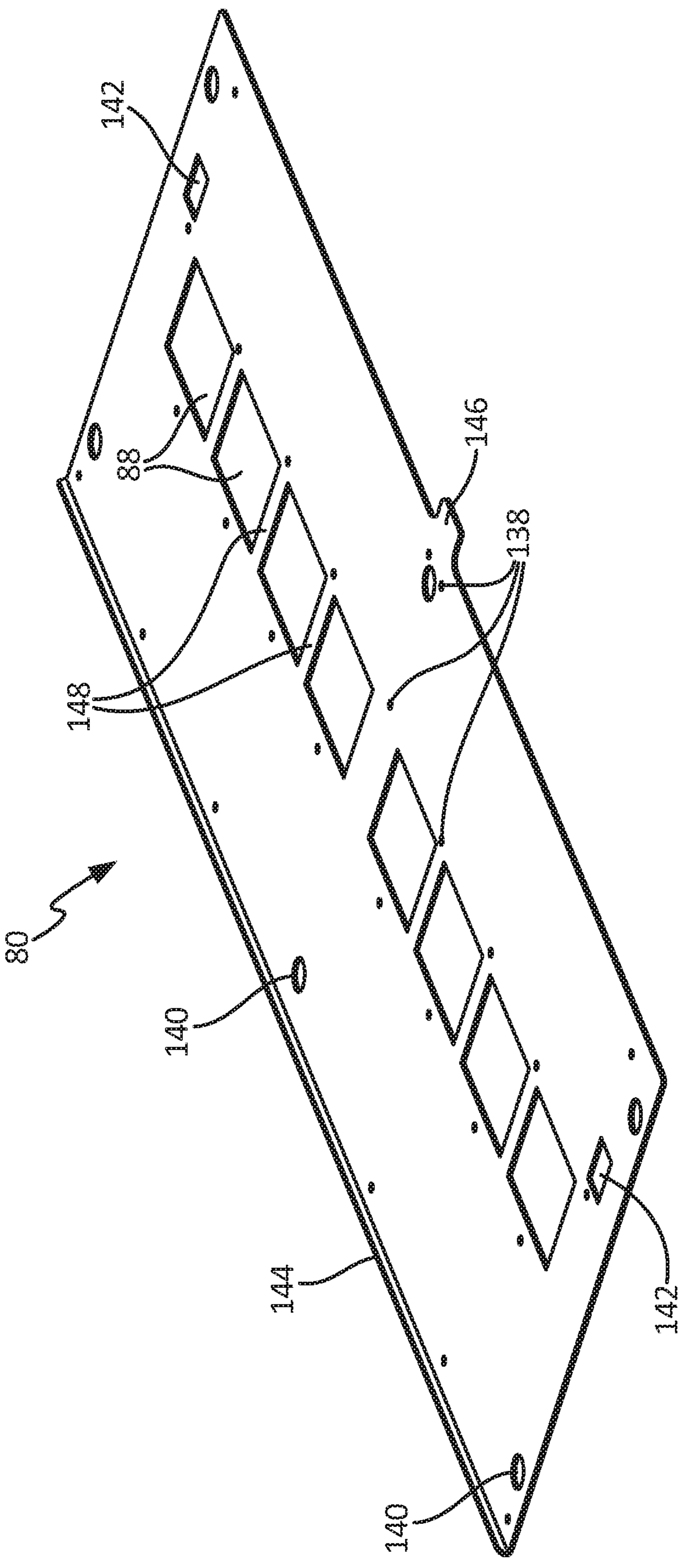
FIG. 5 is a perspective view of a top plate of a sectional control device.

FIG. 5 is a top perspective view of first outer plate 80. First outer plate 80 includes outer particulate receiving openings 88, fastener openings 138, bushing openings 140, installation openings 142, plate flange 144, and mounting tab 146. Outer particulate receiving openings 88 include partitions 148. Outer plate receiving openings 88 extend through first outer plate 80 and provide a passageway for particulate material to pass through first outer plate 80. Partitions 148 are disposed between individual outer particulate receiving openings 88. Mounting tab 146 extends aft from first outer plate 80. Mounting tab 146 can provide a sealing surface for a gasket of housing 54 (shown in FIGS. 2A and 3) to seal against. Bushing openings 140 extend through first outer plate 80 and are configured to receive bushings 60 (best seen in FIG. 2B). Fastener openings 138 similarly extend through first outer plate 80 and are configured to receive plate fasteners 66 (best seen in FIG. 2B). Plate flange 144 is disposed at a forward end of first outer plate 80 and is configured to retain gasket 58*a* (shown in FIGS. 2A-3) on first outer plate 80. Pressurization openings 142 extend through first outer plate 80. Pressurization openings 142 provide a passageway for pressurized air, such as air from pneumatic system 16 (shown in FIG. 1) to flow through first outer plate 80. During operation, air from pneumatic system 16 enters meter mechanism 22 (shown in FIG. 1A), travels through a supply tube and is provided near a top of supply tank 20 (shown in FIG. 1A) to pressurize the particulate material in supply tank 20. The pressurization in supply tank 20 ensures that the particulate material is able to flow out of supply tank 20 and into meter mechanism 22. The pressurized air provided to pressurization openings 142 can also provide pressurized air to housing 54 through filter assembly 55 to pressurize housing 54 during operation.

Outer particulate receiving openings 88 define a portion of particulate openings 36 (best seen in FIG. 1B) through which the particulate material can flow from meter mechanism 22 and into primary manifold 24. Each first outer opening 88 can be associated with individual distribution lines 32 (shown in FIGS. 1A and 1B), such that any particulate material intended for an individual distribution line 32 must pass through the first outer opening 88 associated with that distribution line 32 prior to entering that distribution line 32. Partitions 148*a* can provide a barrier between adjacent outer particulate receiving openings 88 to prevent particulate material from migrating into an adjacent first outer opening 88.

Figure 6:
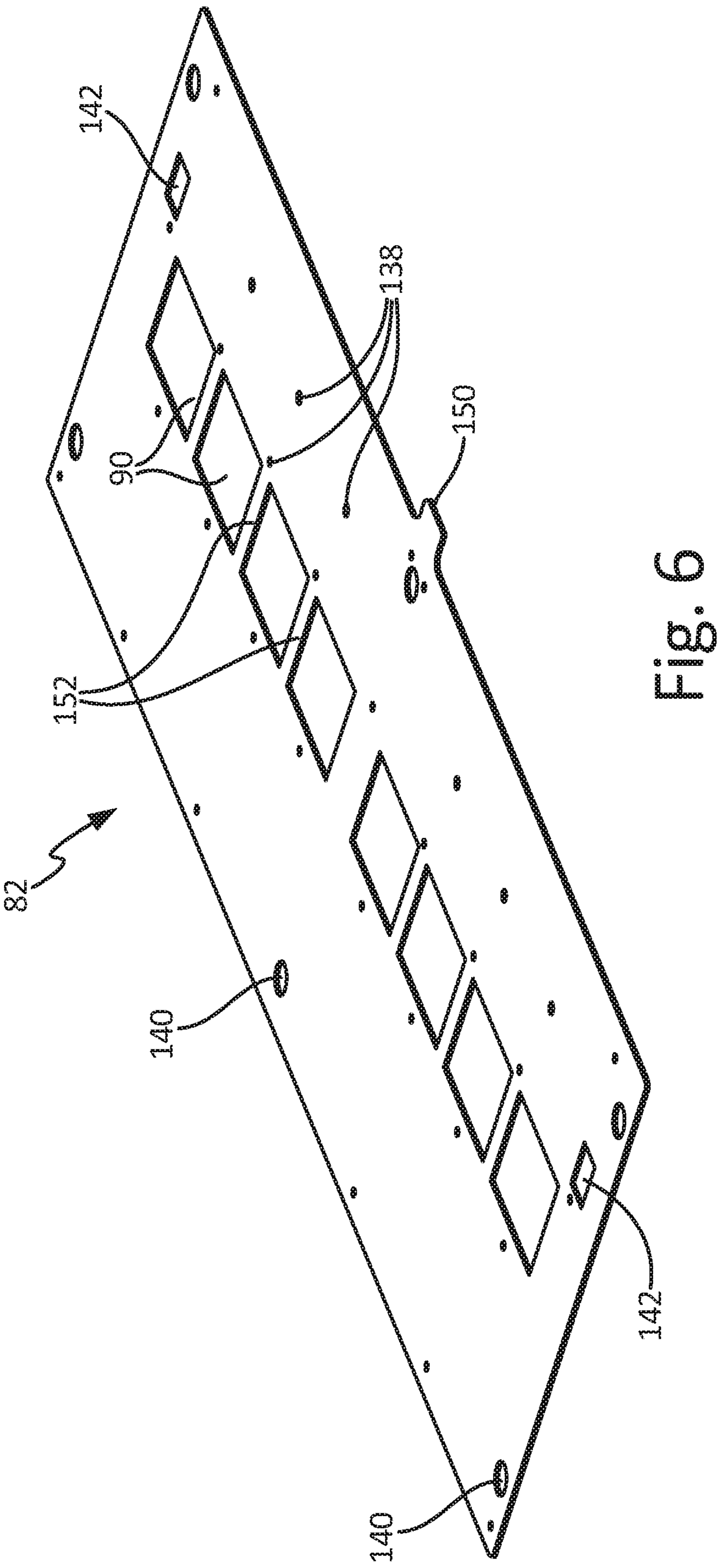
FIG. 6 is a perspective view of an intermediate plate of a sectional control device.

FIG. 6 is a top perspective view of first intermediate plate 82. First intermediate plate 82 includes inner particulate receiving openings 90, fastener openings 138, bushing openings 140, pressurization openings 142, and support tab 150. Inner particulate receiving openings 90 include partitions 152. Inner particulate receiving openings 90 extend through first intermediate plate 82 and provide a passageway for particulate material to pass through first intermediate plate 82. Partitions 152*b* are disposed between individual inner particulate receiving openings 90 to further define inner particulate receiving openings 90. Support tab 150 extends aft from first intermediate plate 82. Support tab 150 can provide support to mounting tab 146 of first outer plate 80. Bushing openings 140 extend through first intermediate plate 82 and are configured to receive bushings 60 (best seen in FIG. 2B). Fastener openings 138 similarly extend through first intermediate plate 82 and are configured to receive plate fasteners 66 (best seen in FIG. 2B). Pressurization openings 142 extend through first intermediate plate 82. Pressurization openings 142 provide a passageway for pressurized air, such as air from pneumatic system 16 (shown in FIG. 1A) to flow through first intermediate plate 82. During operation, air from pneumatic system 16 enters meter mechanism 22 (shown in FIG. 1A), travels through a supply tube and is provided near a top of supply tank 20 (shown in FIG. 1A) to pressurize the particulate material in supply tank 20. The pressure in supply tank 20 ensures that the particulate material is able to flow out of supply tank 20 and into meter mechanism 22.

Inner particulate receiving openings 90 define a portion of particulate openings 36 (best seen in FIG. 1B) through which the particulate material can flow from meter mechanism 22 and into primary manifold 24. Each first intermediate opening 90 can be associated with individual distribution lines 32 (shown in FIGS. 1A and 1B), such that any particulate material intended for an individual distribution line 32 must pass through the first intermediate opening 90 associated with that distribution line 32 prior to entering that distribution line 32. Partitions 152*a* can provide a barrier between adjacent inner particulate receiving openings 90 to prevent particulate material from migrating into an adjacent first outer opening 88.

Figure 7:
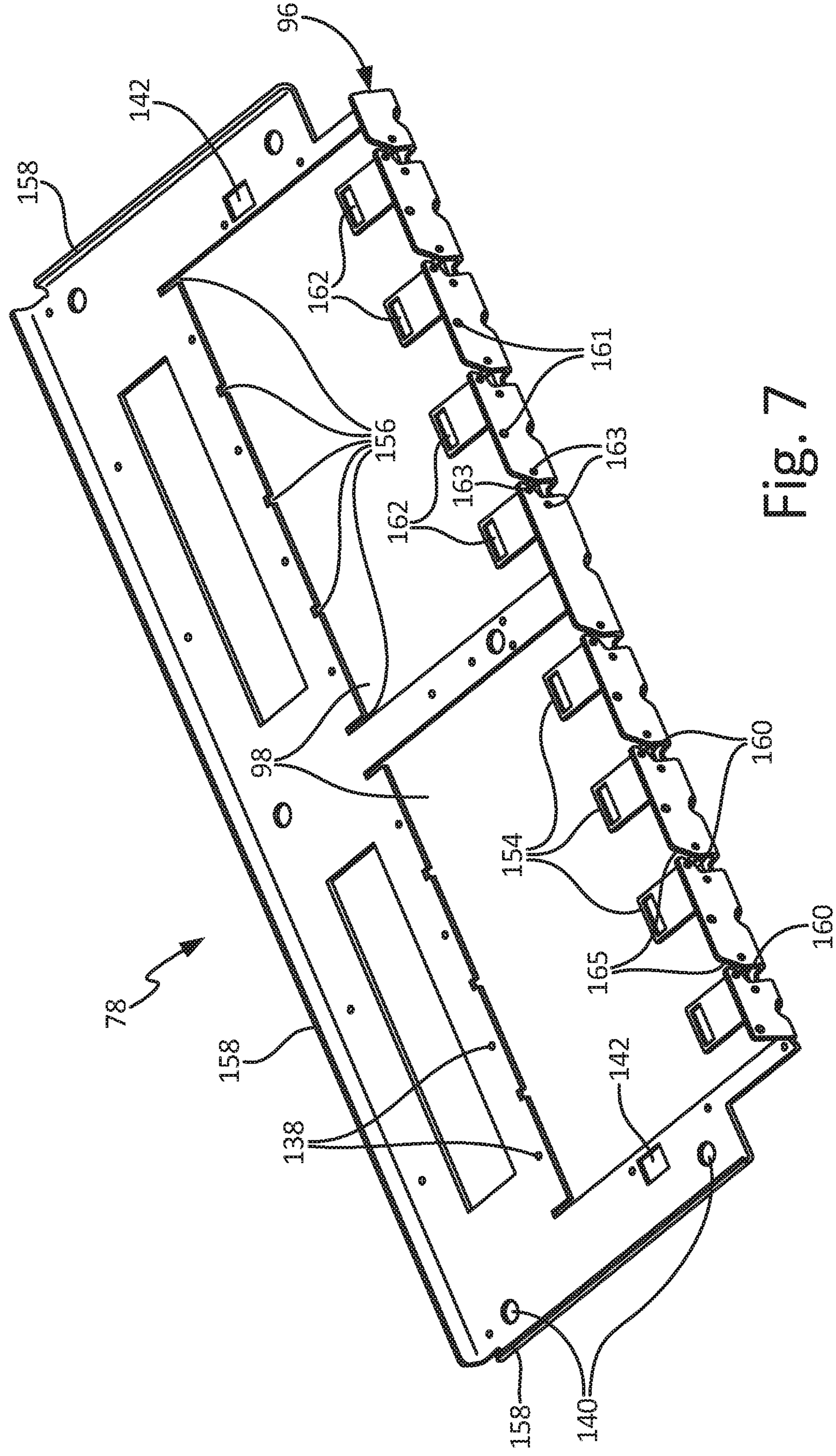
FIG. 7 is a perspective view of a chassis of a sectional control device.

FIG. 7 is a top perspective view of chassis 78. Chassis 78 includes mounting flange 96, gate apertures 98, fastener openings 138, bushing openings 140, pressurization openings 142, tabs 154, spacer slots 156, and flanges 158. Mounting flange 96 includes actuator apertures 160, controller mounting apertures 161, actuator mounting apertures 163, and slots 165. Tabs 154 include switch apertures 162. Gate apertures 98 extend through chassis 78 and are configured to receive gates 44 (shown in FIGS. 1B-4). Mounting flange 96 is disposed at an aft end of chassis 78 adjacent gate aperture 98 and extends radially from chassis 78. Actuator apertures 160 extend through mounting flange 96 and are each configured to receive an actuator arm, such as screw 42 (best seen in FIG. 3) or piston 42' (shown in FIG. 14), of shut-off mechanism 38 (shown in FIGS. 1A-4). Slots 165 extend into mounting flange 96 and intersect with actuator apertures 160. Slots 165 are configured to provide pathways for screws 42 to slide into and out of actuator apertures 160. As such, slots 165 allow actuators 40 to be installed on mounting plate 178 radially, by sliding an actuator arm, such as screw 42 and/or piston 42' into actuator aperture 160 through slot 165, or axially, by sliding the actuator arm through actuator aperture 160. Controller mounting aperture 161 extend through mounting flange 96 and are configured to receive fasteners to secure a controller, such as controllers 34*a* and 34*b* (shown in FIG. 1B), to mounting flange 96. Actuator mounting apertures 163 extend through mounting flange 96 and are configured to receive actuator fasteners 68 (best seen in FIG. 2B) to secure a portion of actuator 40, such as motor 41 (shown in FIGS. 1B-4), to mounting flange 96.

Tabs 154 are disposed at the aft end of chassis 78 and extend axially into gate apertures 98. Switch apertures 162 extend through tabs 154 and are configured to provide an opening though which switches 62*a* and 62*b* (best seen in FIG. 3) can extend. Each tab 154 can extend into the gap disposed between first axial leg 110 (shown in FIG. 4) and second axial leg 112 (shown in FIG. 4) of a gate 44 (best seen in FIG. 4). Spacer slots 156 extend into a body of chassis 78 from gate apertures 98, and spacer slots 156 are configured to receive a portion of spacers 64 (shown in FIGS. 2B and 10) to retain spacers 64 on chassis 78. Flanges 158 extend from the forward and side edges of chassis 78 and provide stiffness to chassis 78. Flanges 158 also provide a clearance fit to other plates mounted on chassis 78. Bushing openings 140 extend through chassis 78 and are configured to receive bushings 60 (best seen in FIG. 2B). Fastener openings 138 extend through chassis 78 and are configured to receive plate fasteners 66 (best seen in FIG. 2B). Pressurization openings 142 extend through chassis 78. Pressurization openings 142 provide a passageway for pressurized air, such as air from pneumatic system 16 (shown in FIG. 1A) to flow through chassis 78 to pressurize the particulate material in supply tank 20 (shown in FIG. 1A). The pressure in supply tank 20 ensures that the particulate material is able to flow out of supply tank 20 and into meter mechanism 22.

Gate apertures 98 define a portion of a particulate opening, such as particulate opening 36 (best seen in FIG. 1B), through which the particulate material can flow from meter mechanism 22 and into distribution lines 32 (shown in FIGS. 1A and 1B). Gate apertures 98 are configured to receive gates 44, and gates 44 can slide within gate apertures 98 between both the open position and the closed position. A forward portion of gate apertures 98 can provide a hard stop for gates 44 transitioning to the closed position such that gate 44 resists further forward movement due to the hard stop, thereby providing feedback, through the resistance, that gate 44 is in the closed position. Tabs 154 can provide a hard stop for gates 44 transitioning to the open position such that tab 154 stops rearward movement gate 44. Tab 154 stopping gate 44 can provide feedback, through the resistance and associated increase in current at motor 40, that gate 44 is in the open position. The increase in current can be sensed by controller 34 or other component, and motor 41 can be deactivated in response to the increase in current. Tabs 154 can also axially align gates 44 within gate apertures 98 due to tabs 154 being disposed between first axial leg 110 and second axial leg 112, thereby resisting any rotation of gate 44 out of axial alignment. Moreover, tabs 154 also provide protection to wires extending from switches 62*a* and 62*b*.

Figure 8:
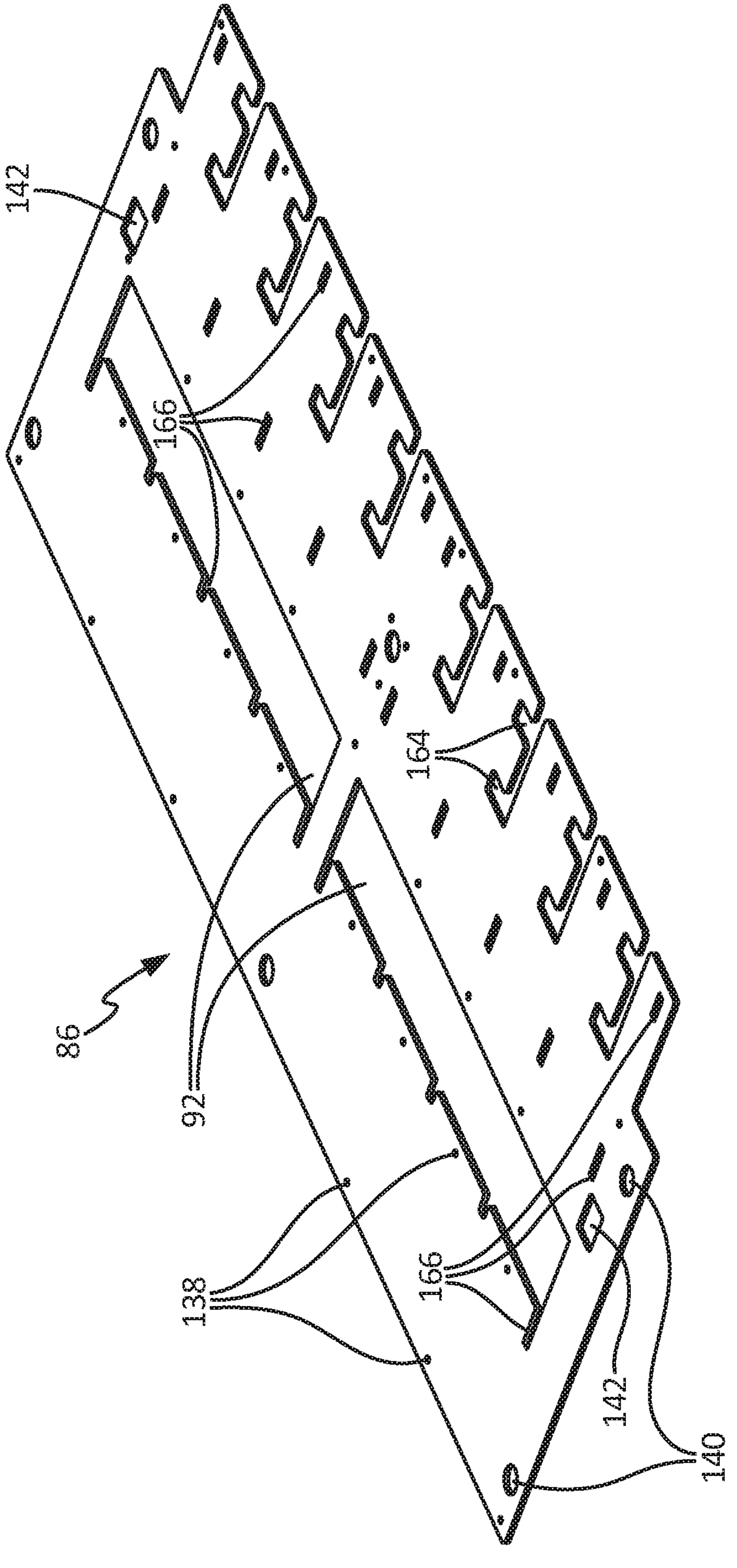
FIG. 8 is a perspective view of an intermediate plate of a sectional control device.

FIG. 8 is a top perspective view of second intermediate plate 86. Second intermediate plate 86 includes inner particulate supply openings 92, fastener openings 138, bushing openings 140, pressurization openings 142, switch apertures 164, and spacer mounting slots 166. Inner particulate supply openings 92 extend through second intermediate plate 86. Inner particulate supply openings 92 define a portion of particulate openings 36 (best seen in FIG. 1B) through which the particulate material can flow through sectional control assembly 12 (shown in FIGS. 1A-4). It is understood that similar to first intermediate plate 82, second intermediate plate 86 can include partitions to further define inner particulate supply openings 92. Switch apertures 164 extend through second intermediate plate 86 and are configured to provide openings for switches 62*a* and 62*b* (best seen in FIG. 3) to extend through. Spacer mounting slots 166 extend into second intermediate plate 86 and are configured to receive a portion of spacers 64 (shown in FIGS. 2B and 10) to retain spacers 64 in a desired position. Bushing openings 140 extend through first intermediate plate 82 and are configured to receive bushings 60. Fastener openings 138 similarly extend through first intermediate plate 82 and are configured to receive plate fasteners 66 (best seen in FIG. 2B). Second outer plate 84 can include fastener receivers, such as nuts, integral with fastener openings 138 through second outer plate 84 or with a bottom side of second outer plate 84. In this way, plate fasteners 66 can extend through plate assembly 56 (best seen in FIG. 3) and connect to second outer plate 84 to secure plate assembly 56 together. Installation openings 142 extend through first intermediate plate 82. Pressurization openings 142 extend through second intermediate plate 86. Pressurization openings 142 provide a passageway for pressurized air, such as air from pneumatic system 16 (shown in FIG. 1A) to flow through chassis 78 to pressurize the particulate material in supply tank 20 (shown in FIG. 1A). The pressure in supply tank 20 ensures that the particulate material is able to flow out of supply tank 20 and into meter mechanism 22. Second intermediate plate 86 supports gates 44 on a top surface of second intermediate plate 86.

Figure 9:
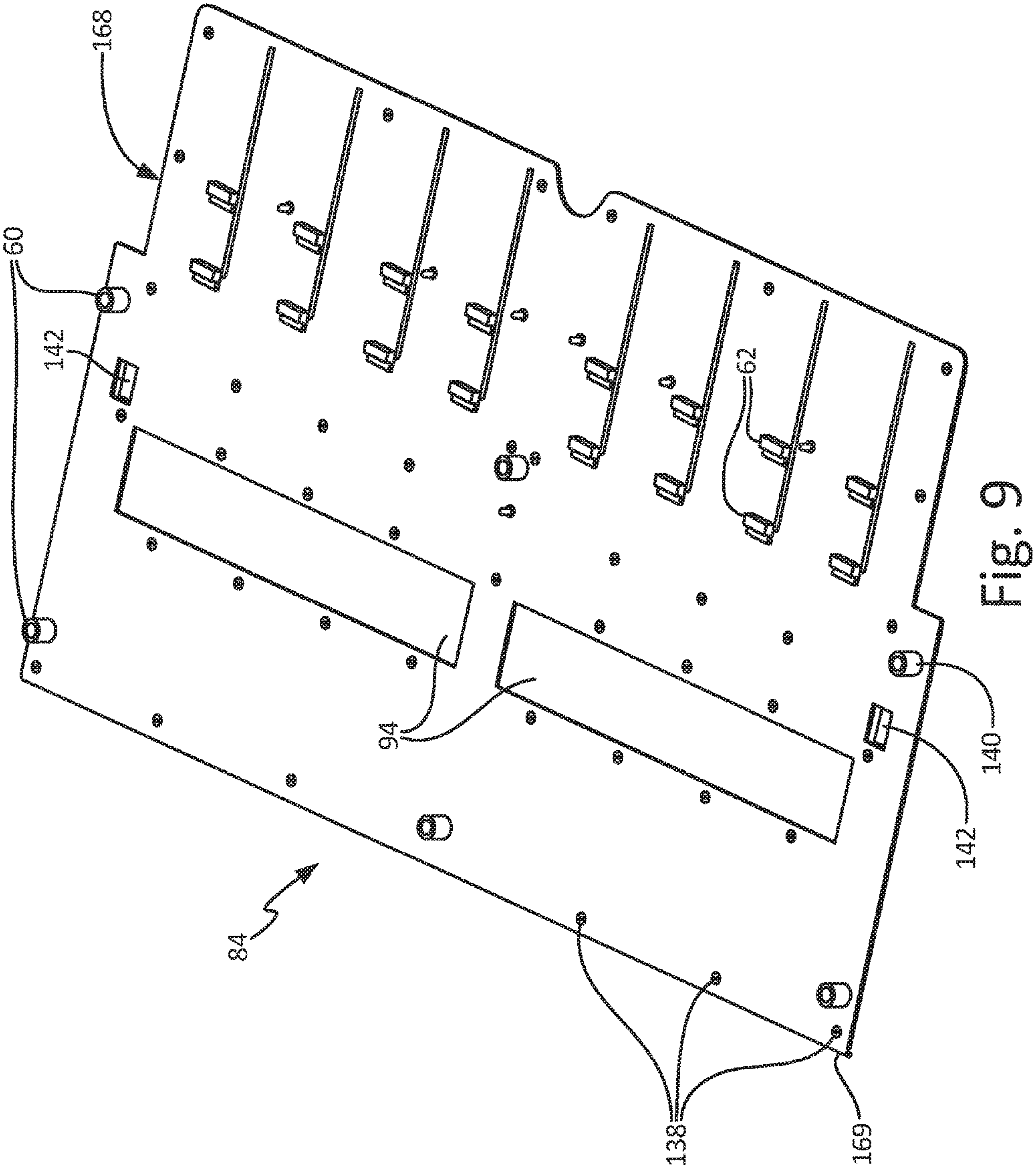
FIG. 9 is a perspective view of a bottom plate of a sectional control device.

FIG. 9 is a top perspective view of second outer plate 84. Second outer plate 84 includes switches 62, outer particulate supply openings 94, fastener openings 138, bushing openings 140, installation openings 142, support extension 168, and stiffening flange 169. Outer particulate supply openings 94 define a portion of particulate openings 36 (best seen in FIG. 1B) through which the particulate material can flow through sectional control assembly 12 (shown in FIGS. 1A-4). It is understood that similar to first outer plate 80 (best seen in FIG. 5), second outer plate 84 can include partitions to further define outer particulate supply openings 94. Support extension 168 extends axially aft on second outer plate 84. Switches 62 are mounted on support extension 168. Stiffening flange 169 extends from an edge of second outer plate 84 opposite support extension 168, and stiffening flange 169 provides additional stiffness to second outer plate 84. Bushing openings 140 extend through second outer plate 84 and are configured to receive bushings 60. Bushings 60 can be connected to an outer surface of second outer plate 84 in any suitable manner, such as by welding. Fastener openings 138 similarly extend through first outer plate 80 and are configured to receive plate fasteners 66 (best seen in FIG. 2B). Fastener openings 138 can include a mount, such as a nut pressed into a bottom surface of second outer plate 84, to receive plate fasteners 66 and secure plate fasteners 66 to second outer plate 84.

Support extension 168 is configured to support a component housing, such as housing 54 (shown in FIGS. 2A-2B), as well as the various components within the housing. Support extension 168 can provide a sealing surface against which housing 54 can seal to prevent contaminants from entering an internal portion of housing 54. Outer particulate supply openings 94 define a portion of particulate openings 36 through which the particulate material can flow from meter mechanism 22 and into distribution lines 32.

Figure 10:
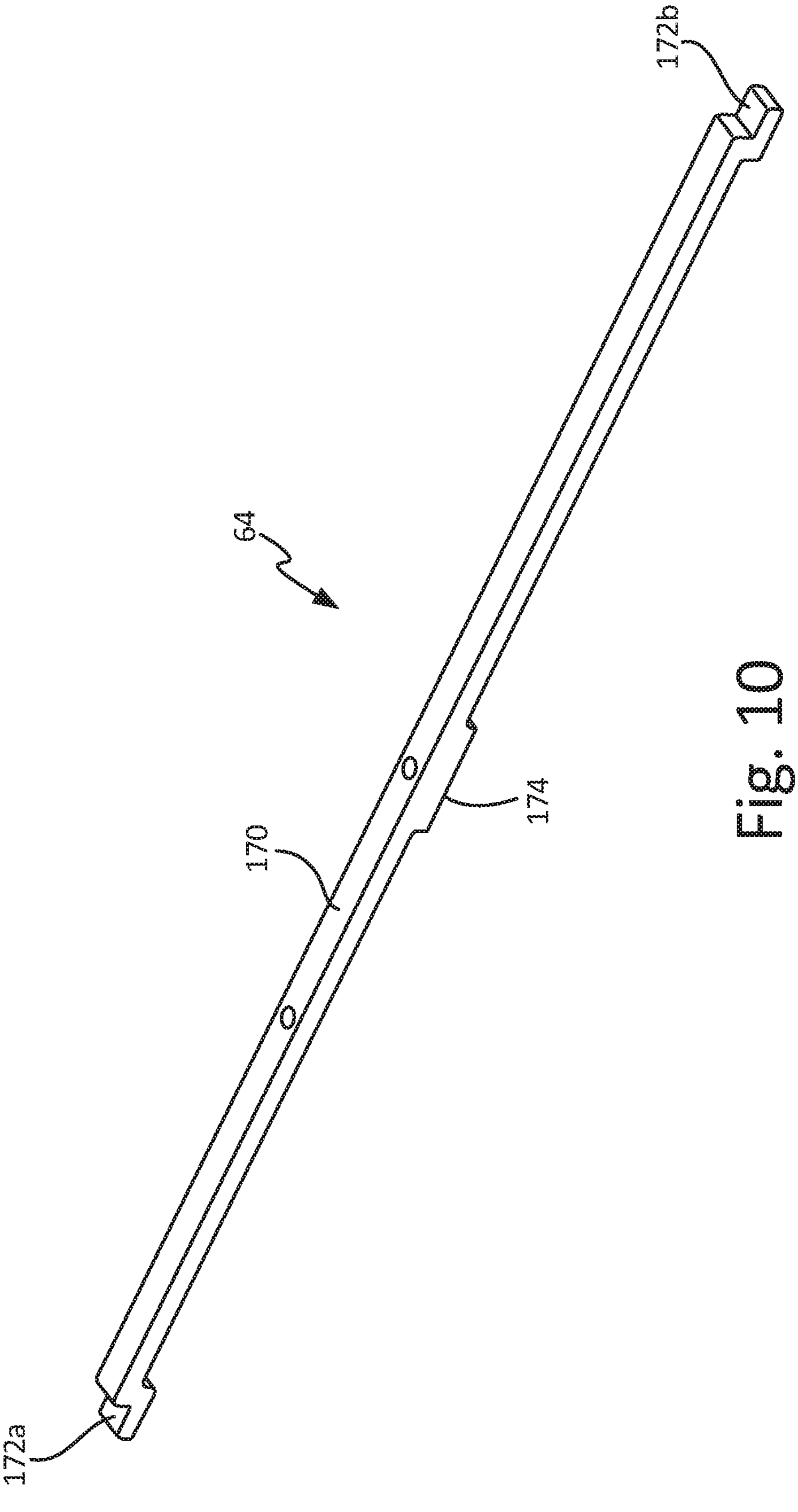
FIG. 10 is a perspective view of a spacer.

FIG. 10 is a perspective view of spacer 64. Spacer 64 includes spacer body 170, spacer tab 172*a*, spacer tab 172*b*, and spacer tab 174. Spacer tab 172*a* is disposed as a first end of spacer 64 and spacer tab 172*b* is disposed at a second end of spacer 64 opposite the first end of spacer 64. Spacer tab 174 extends from spacer body 170 between spacer tab 172*a* and spacer tab 172*b*. Spacer 64 is configured to snap fit to chassis 78 (best seen in FIG. 6) with spacer tab 172*a*, spacer tab 172*b*, and spacer tab 174 extending below chassis 78 through spacer slots 156 (best seen in FIG. 6) in chassis 78. Spacer tab 172*a*, spacer tab 172*b*, and spacer tab 174 can then extend into spacer slots 156 (best seen in FIG. 7) in second intermediate plate 86 (best seen in FIG. 7). Spacer 64 is configured to be disposed between first intermediate plate 82 (best seen in FIG. 4) and second intermediate plate 86. Spacer body 170 contacts both first intermediate plate 82 and second intermediate plate 86 and prevents first intermediate plate 82 and second intermediate plate 86 from exerting a clamping force on gates 44 (best seen in FIG. 9) when first intermediate plate 82 and second intermediate plate 86 are secured together. Spacer body 170 is further disposed between adjacent gates 44 and provides axial alignment for gates 44 to prevent gates 44 from shifting during operation. Spacers 64 thus provide both compression protection and axial alignment to gates 44.

Figure 11A:
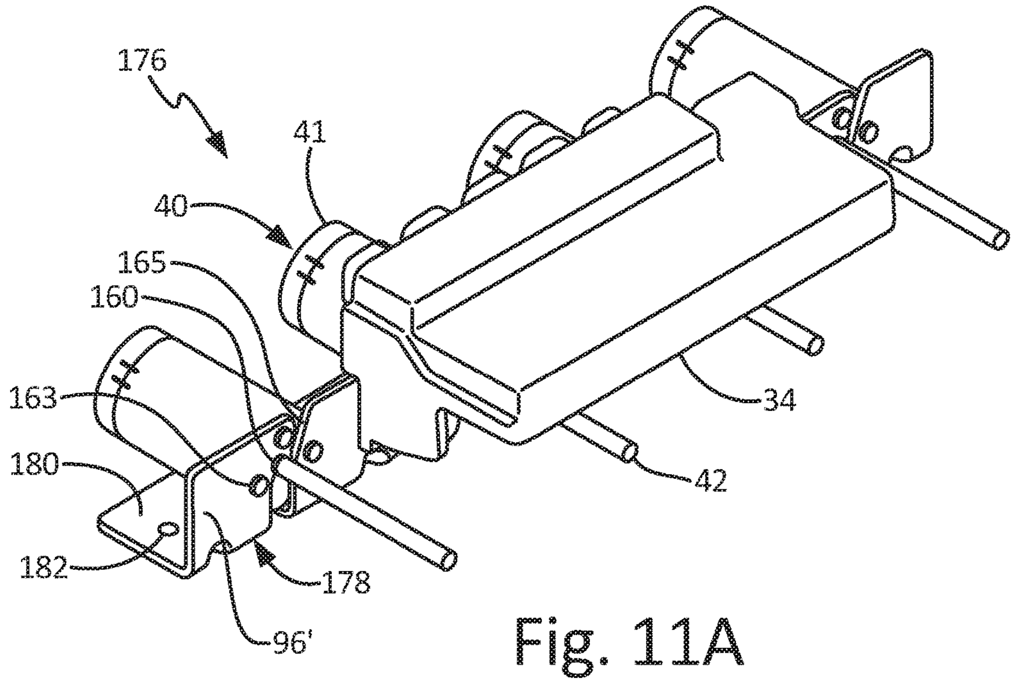
FIG. 11 is a perspective view of a quick-mount assembly.
Figure 11B:
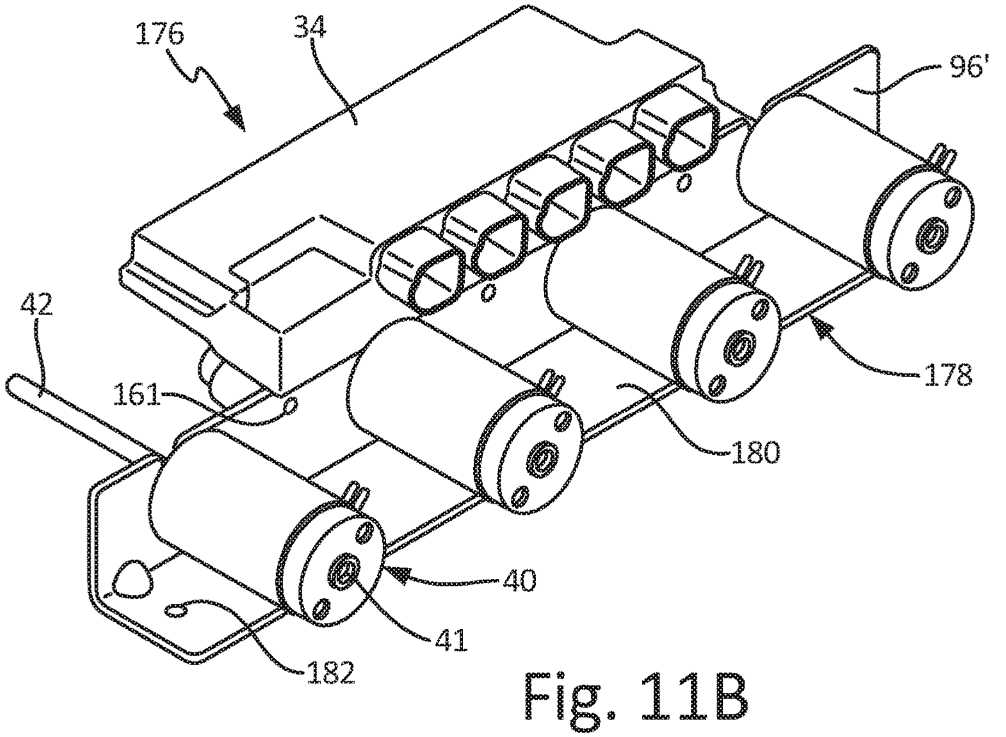

FIG. 11A is a front perspective view of quick-mount assembly 176. FIG. 11B is a rear perspective view of quick-mount assembly 176. FIGS. 11A and 11B will be discussed together. Quick-mount assembly 176 includes mounting plate 178, actuators 40, and controller 34. Mounting plate 178 includes mounting flange 96' and base flange 180. Mounting flange 96' includes actuator apertures 160, controller mounting apertures 161, actuator mounting apertures 163, and slots 165. Base flange 180 includes installation apertures 182. Actuators 40 include motors 41 and screws 42.

Actuators 40 are disposed on mounting plate 178, with motors 41 attached to mounting flange 96' and disposed on base flange 180. Screws 42 extend through actuator apertures 160. While actuators 40 are described as including screws 42, it is understood that actuator 40 can include any suitable actuating mechanism, including a linear actuator where screws 42 are linearly displaced. Slots 165 extend into mounting flange 96' and intersect with actuator apertures 160. Slots 165 are configured to provide pathways for screws 42 to slide into and out of actuator apertures 160. As such, slots 165 allow actuators 40 to be installed on mounting plate 178 radially, by sliding an actuator arm, such as screw 42 (best seen in FIG. 4) and/or piston 42' (shown in FIG. 13) into actuator aperture 160 through slot 165, or axially, by sliding the actuator arm through actuator aperture 160. Actuator fasteners 68 extend through actuator mounting apertures 163 and engage a portion of actuator 40, such as motor 41, to mounting flange 96'. Controller fasteners (not shown) extend through controller mounting apertures 161 and engage controller 34 to secure controller 34 to mounting plate 178. In some examples, controller 34 can extend from a forward side of mounting flange 96' over screws 42. As such, limit switches, such as switches 62, can be mounted on a lower side of controller 34 to sense a position of gate 44. With actuators 40 and controller 34 secured to mounting plate 178, quick-mount assembly 176 can be installed in a sectional control device, such as sectional control device 12, as a single assembly. Fasteners can extend through installation apertures 182 in base flange 180 to secure quick-mount assembly 176 to a chassis, such as chassis 78 (shown in FIG. 12).

Quick-mount assembly 176 provides significant advantages. Quick-mount assembly 176 provides multiple actuators 40 and an associated controller 34 banked together in a single installation unit. As such, the user can install the quick-mount assembly 176 by inserting the quick-mount assembly 176 into a sectional control device, such as sectional control device 12; securing base flange 180 to a plate within the sectional control device, such as chassis 78', with fasteners extending through installation openings; connecting controller 34 to a control system, such as a control system on the tractor, to allow controller 34 to receive commands and information from and supply information to the user; and attaching actuators 40 to gates, such as attaching gates 44 to screws 42 with attachment assemblies 46. Quick-mount assembly 176 reduces installation and maintenance time, and allows a full bank of actuators 40 and a controller 34 to be installed and/or uninstalled simultaneously.

Figure 12:
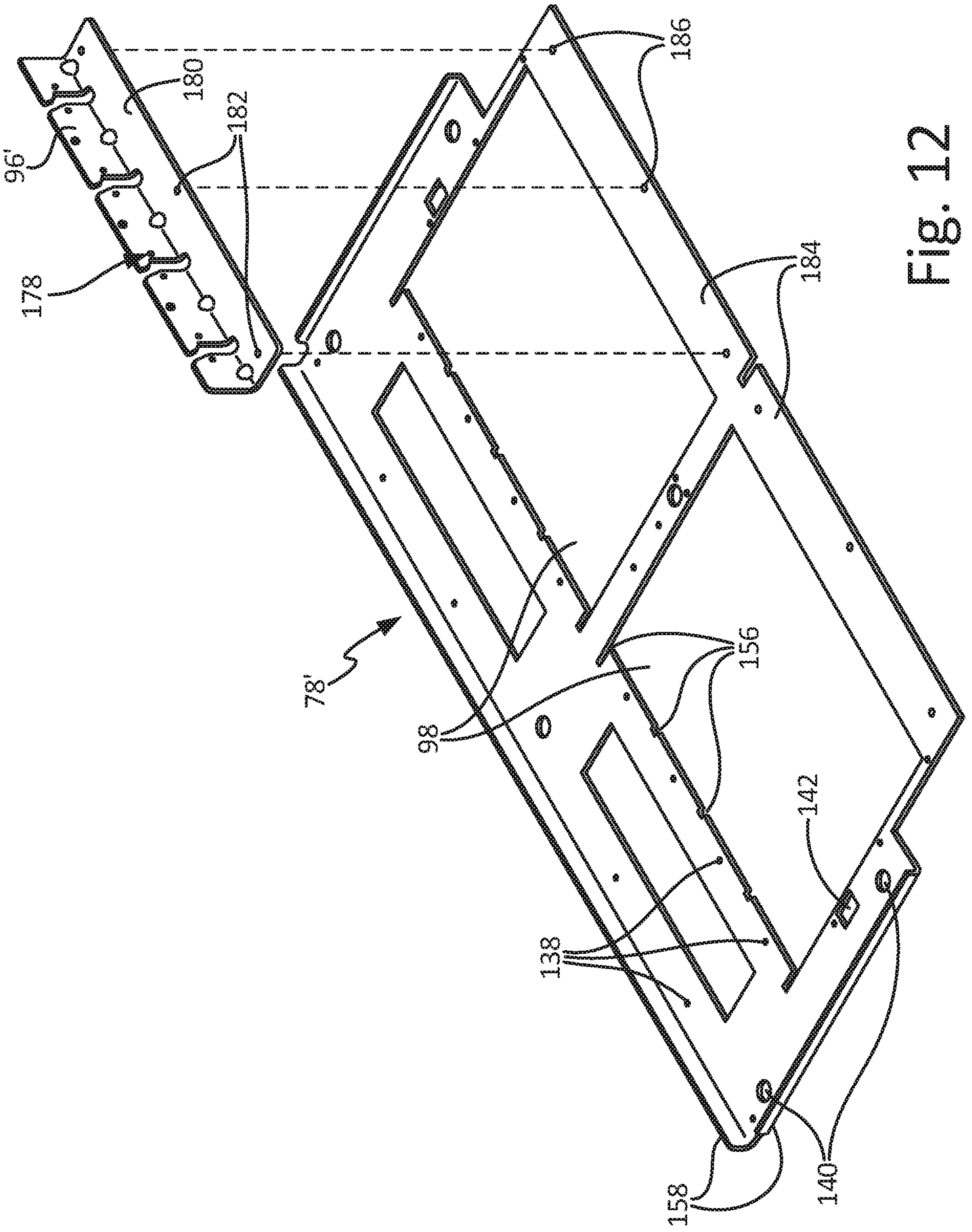
FIG. 12 is an exploded view of another chassis and a mounting plate of a sectional control device.

FIG. 12 is an exploded view of chassis 78' and mounting plate 178 of quick-mount assembly 176 (shown in FIGS. 11A-11B). Chassis 78' includes gate apertures 98, fastener openings 138, bushing openings 140, pressurization openings 142, spacer slots 156, flanges 158, and support bars 184. Support bar 184 includes installation apertures 186. Mounting plate 178 includes mounting flange 96' and base flange 180. Base flange 180 includes installation apertures 182.

Gate apertures 98, fastener openings 138, bushing openings 140, pressurization openings 142, and spacer slots 165 extend through chassis 78'. Support bar 184 extends rearward from gate apertures 98, with installation apertures 186 extending though support bar 184. Mounting plate 178 can be secured to chassis 78' to mount quick-mount assembly 176 on chassis 78'. Fasteners extend through installation openings 182 on base flange 180 and installation openings 186 on support bar 184 to secure mounting plate 178, and thus quick-mount assembly 176, to chassis 78'. With mounting plate 178 installed on chassis 78', base flange 180 extends rearward from mounting flange 96'. Base flange 180 extending rearward further facilitates easy installation of mounting plate 178 on chassis 78' by positioning base flange 180 such that base flange 180 does not interfere with various components of sectional control assembly 12 (best seen in FIG. 2A) when quick-mount assembly 176 is installed or removed.

Spacer slots 156 extend into a body of chassis 78' from gate apertures 98, and spacer slots 156 are configured to receive a portion of spacers 64 (shown in FIGS. 2B and 10) to retain spacers 64 on chassis 78'. Flanges 158 extend from the forward and side edges of chassis 78' and provide stiffness to chassis 78'. Flanges 158 also provide a clearance fit to other plates mounted on chassis 78'. Bushing openings 140 extend through chassis 78' and are configured to receive bushings 60 (best seen in FIG. 2B). Fastener openings 138 extend through chassis 78' and are configured to receive plate fasteners 66 (best seen in FIG. 2B). Pressurization openings 142 extend through chassis 78'. Pressurization openings 142 provide a passageway for pressurized air, such as air from pneumatic system 16 (shown in FIG. 1A) to flow through chassis 78' to pressurize the particulate material in supply tank 20 (shown in FIG. 1A).

Gate apertures 98 define a portion of a particulate opening, such as particulate opening 36 (best seen in FIG. 1B), through which the particulate material can flow from meter mechanism 22 and into distribution lines 32 (shown in FIGS. 1A and 1B). Gate apertures 98 are configured to receive gates, such as gates 44 (best seen in FIG. 4) and gates 44' (best seen in FIG. 13), and the gates can slide within gate apertures 98 between both the open position and the closed position. A forward portion of gate apertures 98 can provide a hard stop for the gates transitioning to the closed position such that further forward movement of the gate is resisted by the hard stop, thereby providing feedback, through the resistance, that the gate is in the closed position. Mounting flange 96' can provide a hard stop for gates transitioning to the open position, such that mounting flange 96' resists any further rearward movement of gate 44 and can provide feedback, through the resistance, that gate 44 is in the open position. In one example, a portion of the gate can encounter actuator fasteners 68 (best seen in FIG. 11A) extending through mounting flange 96', and actuator fasteners 68 can provide the hard stop to resist further rearward movement of the gate.

Chassis 78' and mounting plate 178 provide significant advantages. Mounting plate 178 can be attached to and detached from chassis 78' with fasteners extending through installation openings 182 and installation openings 186, thereby facilitating quick and easy installation and removal of quick-mount assembly 176. In addition, mounting plate 178 banks multiple actuators 40 together for installation as a single unit, such that all actuators 40 associated with a gate aperture 98 can be installed on chassis 78' as a single unit. Moreover, support bar 184 allows for easy installation and removal of gates when chassis 78' is secured within sectional control device 12. Support bar 184 is relatively flat, such that support bar 184 does not include a physical barrier for a user to insert or remove the gates from gate apertures 98. The user can install a gate by positioning a leading edge of the gate within gate aperture 98 and sliding the gate forward into gate aperture 98. Similarly, the user can remove a gate by pulling the gate rearward over support bar 184. As such, support bar 184 allows gates to be inserted and removed axially even where chassis 78' has been installed in sectional control device 12.

Figure 13:
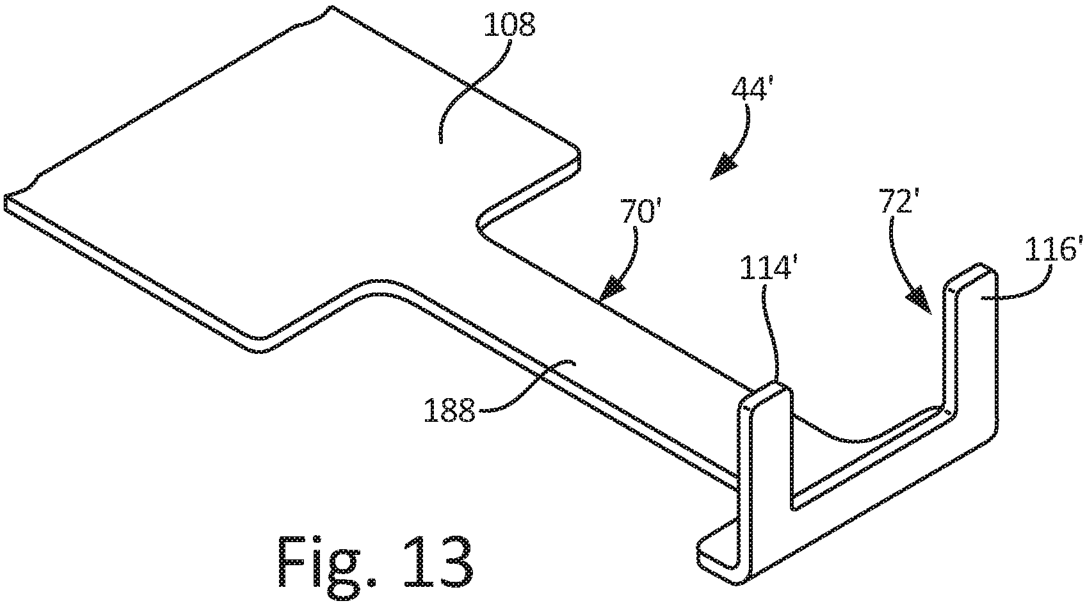
FIG. 13 is a perspective view of a gate.

FIG. 13 is a perspective view of gate 44'. Gate 44' includes axial portion 70' and radial portion 72'. Axial portion 70' includes flow blocker 108 and axial leg 188. Radial portion 72' includes first radial arm 114' and second radial arm 116'. Axial portion 70' of gate 44' extends from radial portion 72'. Flow blocker 108 is configured to block a flow of particulate materials through particulate opening 38 (best seen in FIG. 1B) when gate 44' is in the closed position. Axial leg 188 extends from flow blocker 108 and is attached to radial portion 72'. First radial arm 114' and second radial arm 116' are configured to connect gate 44' to an actuator, such as actuator 40 (best seen in FIG. 4). For example, radial portion 72' can connect gate 44' to the actuator through an attachment assembly, such as attachment assembly 46 (best seen in FIG. 4). In one example, first radial arm 114' extends into and engages first groove 122 (best seen in FIG. 4) of connector 102 (best seen in FIG. 4), and second radial arm 116' extends into and engages second groove 124 (best seen in FIG. 4) of connector 102.

Figure 14:
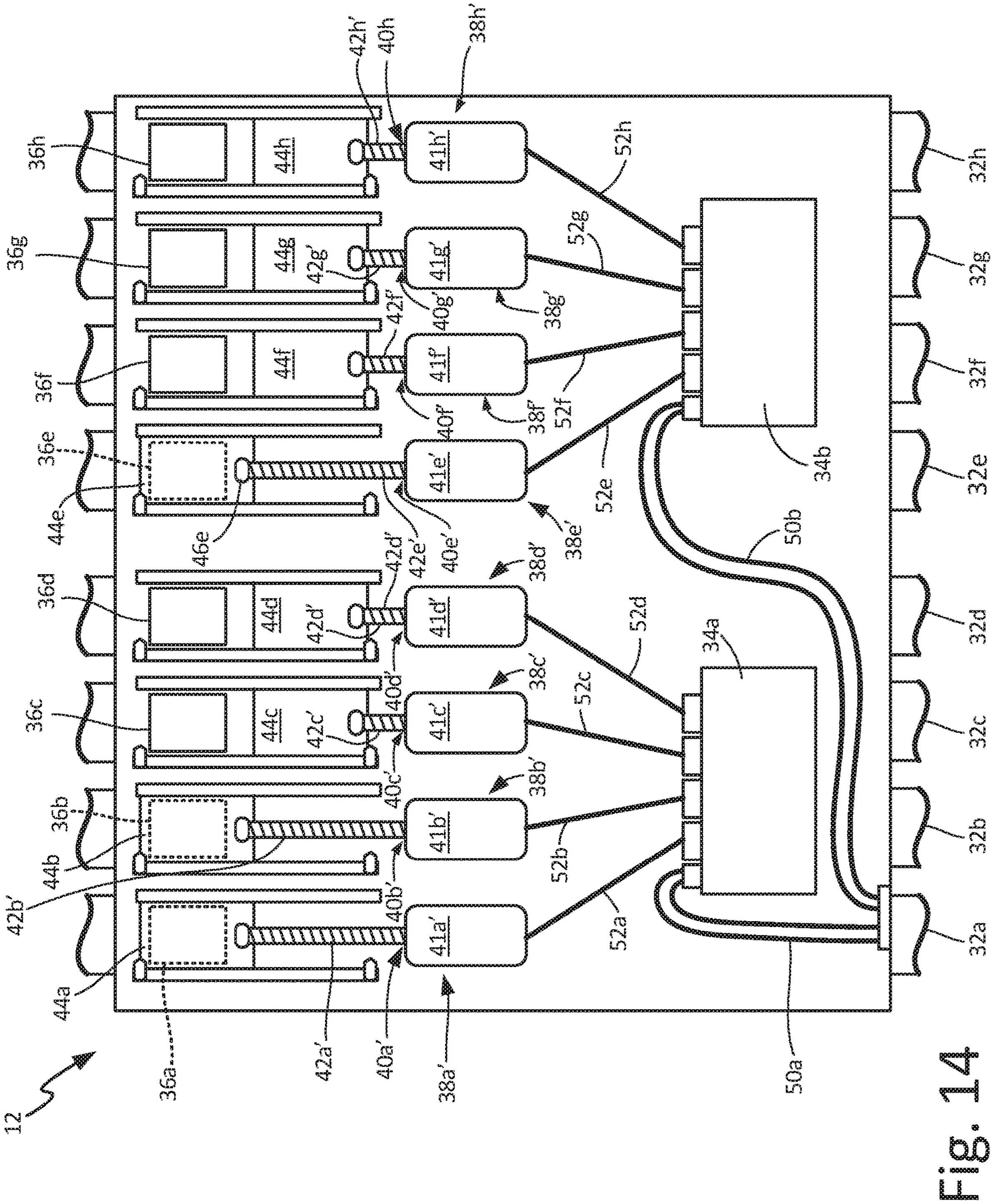
FIG. 14 is a top schematic view of a sectional control assembly.

FIG. 14 is a top schematic view of sectional control assembly 12. Sectional control assembly 12 includes controllers 34*a* and 34*b*, particulate openings 36*a*-36*h*, and shut-off mechanisms 38*a*'-38*h*'. Shut-off mechanisms 38*a*'-38*h*' respectively include actuators 40*a*'-40*h*' and gates 44*a*-44*h*. Actuators 40*a*'-40*h*' include cylinders 41' and pistons 42', respectively.

Sectional control assembly 12 is mounted between meter mechanism 22 (shown in FIG. 1A) and primary manifold 24 (shown in FIG. 1A), and is configured to control the flow of particulate material to primary manifold 24 from meter mechanism 22. Particulate openings 36*a*-36*h* provide a pathway for the particulate material to flow through sectional control assembly 12. Gates 44*a*-44*h* are slidable between an open position, where the particulate material can flow through particulate openings 36*a*-36*h*, and a closed position, where gates 44*a*-44*h* block particulate openings 36*a*-36*h*, respectively, to prevent the particulate material from flowing through sectional control assembly 12. Gates 44*a*-44*h* can be positioned at any desired intermediate position between the open position and the closed position.

Gates 44*c*-44*d* and 44*f*-44*h* are depicted in an open position such that particulate openings 36*c*-36*d* and 36*f*-36*h* are unobstructed and particulate material is able to flow to distribution lines 32*c*-32*d* and 32*f*-32*h*. Gates 44*a*-44*b* and 44*e* are depicted in a closed position such that gates 44*a*-44*b* and 44*e* obstruct particulate openings 36*a*-36*b* and 36*e* and particulate material is prevented from flowing to distribution lines 32*a*-32*b* and 32*e*. It is understood, however, that each gate 44 can be positioned in an intermediate position between the open position and the closed position such that gates 44 partially obstruct particulate openings 36 and allow a limited flow of the particulate material to distribution lines 32.

Controllers 34*a* and 34*b* of sectional control assembly 12 can communicate with an operator and/or a control system via communication links 50*a* and 50*b* (shown in FIG. 1A), which can include a wired or wireless connection. Controller 34*a* is connected to and controls shut-off mechanisms 38*a*'-38*d*'. Controllers 34*a* and 34*b* communicate with shut-off mechanisms 38*a*'-38*h*' via control links 52*a*-52*h* to control a position of gates 44*a*-44*h* relative to particulate openings 36*a*-36*h*. Controller 34*a* is connected to and controls shut-off mechanisms 38*a*-38*d* via control links 52*a*-52*d*. Controller 34*b* is connected to and controls shut-off mechanisms 38*e*-38*h* via control links 52*e*-52*h*. The particulate material flows through particulate openings 36*a*-36*h* to reach distribution lines 32*a*-32*h* from supply tanks 20 (FIG. 1).

Actuators 40*a*'-40*h*' are mounted within sectional control assembly 12 and are configured to drive gates 44*a*-44*h* between an open position and a closed position. Actuators 40*a*-40*h* can Cylinders 41'*a*-41'*h* are mounted within sectional control assembly 12, and pistons 42'*a*-42'*h* extend from cylinders 41'*a*-41'*h*, respectively. Pistons 42'*a*-42'*h* can be attached to gates 44*a*-44*h* by attachment assemblies, such as attachment assemblies 46 (best seen in FIG. 4), but it is understood that pistons 42'*a*-42'*h* can be attached to gates 44*a*-44*h* in any desired manner. Cylinders 41'*a*-41'*h* are configured to linearly drive pistons 42'*a*-42'*h* to drive gates 44*a*-44*h* between the open position and the closed position. Similar to actuators 40, actuators 40' can be at least partially disposed within a housing, such as housing 54. Similar to screws 42, pistons 42' can extend through mounting flange 96 (best seen in FIG. 7) between cylinder 41' and gate 44. For example, piston 42' can extend through actuator aperture 160 (shown in FIG. 7) in mounting flange 96 or mounting flange 96'.

To open or close particulate openings 36*a*-36*h*, one of controllers 34*a* and 34*b* can provide command signals, such as via communication links 52*a*-52*h*, to cause actuators 40*a*'-40*h*' to shift gates 44*a*-44*h* between the various positions. For example, controller 34*a* can command actuator 40*a*' to position gate 44*a* in a desired position, such as the open position, the closed position, or an intermediate position. In one example, cylinder 41'*a* can then drive gate 44*a* between the open position and the closed position by the linear displacement of piston 42'*a*. In some examples, cylinders 41'*a*-41'*h* drive pistons 42'*a*-42'*h* hydraulically, pneumatically, and/or electromechanically. For example, actuator 40' can be a hydraulic actuator, such that cylinder 41' is filled with a hydraulic fluid, such as a non-compressible oil, to linearly drive piston 42'. In another example, actuator 40' can be a pneumatic actuator, such that cylinder 41' is filled with compressed air, and the compressed air linearly drives piston 42'. In a further example, actuator 40' is an electromechanical actuator, where cylinder 41' can include both a cylinder and an electric motor connected to and providing power to the cylinder, and the cylinder can house gears and a screw configured to linearly displace piston 42'. In some examples, the motor can provide motive power to the gears, the gears can in-turn provide motive power to the screw, and the screw is connected to and drives piston 42' in a linear manner.

Sectional control assembly 12 provides significant advantages. Sectional control assembly 12 provides on/off control for the flow of particulate material to the air seeding device, thereby preventing over-application in areas of a field that the air seeding device has already traversed. Preventing over-application also saves material costs by eliminating waste of particulate material. Actuators 40' can be hydraulic, pneumatic, or electromechanical, and piston 42' displaces linearly to drive the linear displacement of gates 44. Sectional control assembly 12 provides low cost, easily installed sectional control capabilities to air carts that were not previously equipped with sectional control capabilities.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sectional control mechanism for an air seeder for receiving particulate from a meter roller and providing the particulate to a primary manifold through which air flows to entrain the particulate, the sectional control mechanism comprising:

a plate assembly including a plurality of plates stacked together;

a plurality of particulate openings extending through the plate assembly;

a plurality of shut-off mechanisms associated with the plurality of particulate openings to control a flow of material through the plurality of particulate openings, wherein each shut-off mechanism includes:

a gate disposed between upper and lower plates of the plurality of plates and movable between an open state, where material can flow through the associated particulate opening, and a closed state, where the gate prevents material from flowing through the associated particulate opening, the gate comprising an axial portion disposed between the upper and lower plates, and a radial portion extending from the axial portion;

an actuator having a shaft oriented along a shaft axis and connected to the gate to drive the gate, the actuator including a motor connected to the gate to drive the gate between the open state and the closed state; and an attachment assembly connecting the gate and the actuator, the attachment assembly comprising:

a connector engaging the radial portion of the gate; and a nut disposed on the shaft, the nut comprising a spherical body forming a knuckle joint with the connector; and a controller operatively connected to multiple ones of the plurality of shut-off mechanisms to independently control each of the multiple ones of the plurality of shut-off mechanisms, the controller configured to cause the motor to drive the gate between the open state and the closed state for each of the multiple ones of the plurality of shut-off mechanisms.

2. The sectional control mechanism of claim 1, wherein the plate assembly comprises:

a chassis including a top side, a bottom side, and at least one gate aperture extending through the chassis between the top side and the bottom side;

the upper plate disposed on the top side of the chassis, wherein the upper plate includes at least one receiving opening extending through the upper plate and in flow communication with the at least one gate aperture; and the lower plate disposed on a bottom side of the chassis, wherein the lower plate includes at least one supply opening extending through the lower plate and in flow communication with the at least one gate aperture;

wherein each particulate opening of the plurality of particulate openings is formed by the at least one receiving opening, the at least one gate aperture, and the at least one supply opening; and wherein each gate is at least partially disposed in the at least one gate aperture.

3. The sectional control mechanism of claim 2, wherein the upper plate includes:

a first outer plate including at least one outer receiving opening extending therethrough;

a first intermediate plate disposed on the top of the chassis between the chassis and the first outer plate and including at least one inner receiving opening extending therethrough;

wherein the at least one outer receiving opening is aligned with the at least one inner receiving opening to form the at least one receiving opening.

4. The sectional control mechanism of claim 3, wherein the lower plate includes:

a second outer plate including at least one outer supply opening extending therethrough;

a second intermediate plate disposed on the bottom of the chassis between the chassis and the second outer plate and including at least one inner supply opening extending therethrough;

wherein the first supply opening is aligned with the second supply opening to form the at least one assembly supply opening.

5. The sectional control mechanism of claim 1, wherein the controller is configured to control each gate based on a location of a distribution point associated with the gate in a field.

6. The sectional control mechanism of claim 5, wherein the controller is configured to control each gate based on an input received from a geo-positioning system.

7. The sectional control mechanism of claim 1, further comprising: a plurality of sensors, wherein each sensor of the plurality of sensors is associated with a gate of the plurality of gates to provide data regarding a position of the gate.

8. The sectional control mechanism of claim 7, wherein the controller is configured to stop movement of the gate based on the data provided the sensor.

9. The sectional control mechanism of claim 7, wherein a first one of the plurality of sensors is associated with a first gate of the plurality of gates and is configured to sense the first gate reaching the closed state and a second one of the plurality of sensors is associated with the first gate and is configured to sense the first gate reaching the open state.

10. The sectional control mechanism of claim 1, wherein the controller is configured to:

control operation of a first shut-off mechanism of the multiple ones of the plurality of shut-off mechanisms; and control operation of a second shut-off mechanism of the multiples ones of the plurality of shut-off mechanisms independent from the first shut-off mechanism.

11. The sectional control mechanism of claim 10, wherein the controller is configured to:

provide a first command to a first motor of the first shut-off mechanism to cause the first motor to actuate a first gate to the open state; and provide a second command to a second motor of the second shut-off mechanism to cause the second motor to actuate a second gate to the closed state such that a first particulate opening associated with the first shut-off mechanism is open and a second particulate opening associated with the second shut-off mechanism is closed.

12. The sectional control mechanism of claim 1, wherein the shaft axis is a screw axis, and the shaft is a screw configured to rotate about the screw axis to drive the gate along the screw axis.

13. The sectional control mechanism of claim 1, wherein the shaft is a piston configured to extend and retract along a piston axis to drive the gate along the piston axis.

14. An air seeding system comprising:

a meter assembly including the meter roller, the meter assembly configured to receive particulate material from a particulate supply tank;

the primary manifold including a plurality of distribution lines connected to an air source, the plurality of distribution lines fluidly connected to a plurality of distribution points to provide the particulate material to the plurality of distribution points; and the sectional control assembly of claim 1 disposed between the meter assembly and the primary manifold;

wherein the plurality of shut-off mechanisms are configured to control a flow of particulate material from the meter assembly to the primary manifold.

15. A method of retrofitting an air cart of an air seeding system, the method comprising:

removing a primary manifold from a meter housing that houses a meter roller configured to meter a flow of particulate to the primary manifold;

inserting a sectional control device between the primary manifold and the meter housing, the sectional control device including a controller and a plurality of shut-off mechanisms associated with a plurality of gate apertures, each of the plurality of shut-off mechanisms comprising an actuator attached to a gate, the controller configured to individually control each of the plurality of shut-off mechanisms to individually control particulate flow through each of the plurality of gate apertures; and reattaching the primary manifold to the meter housing with the sectional control device at least partially disposed between and captures between the primary manifold and the meter housing.

16. The method of claim 15, further comprising:

connecting the controller to a control system of a tractor.

17. The method of claim 15, wherein reattaching the primary manifold to the meter housing includes inserting fasteners through the primary manifold and into the meter housing.

18. The method of claim 17, further comprising:

passing the fasteners through a plate assembly of the sectional control device.

19. The method of claim 15, further comprising:

controlling, by the controller, each of the plurality of shut-off mechanisms between an open state and a closed state based on a location of the air cart in a field.

* * * * *